(12) United States Patent
Hata et al.

(10) Patent No.: US 8,114,518 B2
(45) Date of Patent: *Feb. 14, 2012

(54) SINGLE-WALLED CARBON NANOTUBE AND ALIGNED SINGLE-WALLED CARBON NANOTUBE BULK STRUCTURE, AND THEIR PRODUCTION PROCESS, PRODUCTION APPARATUS AND APPLICATION USE

(75) Inventors: Kenji Hata, Ibaraki (JP); Sumio Iijima, Ibaraki (JP); Motoo Yumura, Ibaraki (JP); Don N. Futaba, Ibaraki (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/945,073

(22) Filed: Nov. 12, 2010

(65) Prior Publication Data

US 2011/0117365 A1 May 19, 2011

Related U.S. Application Data

(62) Division of application No. 11/658,577, filed as application No. PCT/JP2005/014239 on Jul. 27, 2005, now Pat. No. 7,854,991.

(30) Foreign Application Priority Data

Jul. 27, 2004 (JP) .................................. 2004-219346
Nov. 17, 2004 (JP) .................................. 2004-333683
Mar. 8, 2005 (JP) .................................. 2005-063704

(51) Int. Cl.
*B32B 9/00* (2006.01)
*D01F 9/12* (2006.01)

(52) U.S. Cl. ................. 428/408; 423/447.2; 423/445 B; 977/742; 977/750

(58) Field of Classification Search ........................ None
See application file for complete search history.

(56) References Cited

U.S. PATENT DOCUMENTS

| 6,756,025 B2 | 6/2004 | Colbert et al. |
| 2003/0224168 A1 | 12/2003 | Mack et al. |

(Continued)

FOREIGN PATENT DOCUMENTS

JP 2004-140288 5/2004

(Continued)

OTHER PUBLICATIONS

International Search Report issued Nov. 8, 2005 in International Application No. PCT/JP2005/014239.

(Continued)

*Primary Examiner* — Timothy Speer
(74) *Attorney, Agent, or Firm* — Wenderoth, Lind & Ponack, L.L.P.

(57) ABSTRACT

This invention provides an aligned single-layer carbon nanotube bulk structure, which comprises an assembly of a plurality of aligned single-layer carbon nanotube and has a height of not less than 10 μm, and an aligned single-layer carbon nanotube bulk structure which comprises an assembly of a plurality of aligned single-layer carbon nanotubes and has been patterned in a predetermined form. This structure is produced by chemical vapor deposition (CVD) of carbon nanotubes in the presence of a metal catalyst in a reaction atmosphere with an oxidizing agent, preferably water, added thereto. An aligned single-layer carbon nanotube bulk structure, which has realized high purify and significantly large scaled length or height, its production process and apparatus, and its applied products are provided.

5 Claims, 36 Drawing Sheets

Vertically aligned SWNT structure

Electrode

U.S. PATENT DOCUMENTS

2009/0122469 A1   5/2009   Hatori et al.

FOREIGN PATENT DOCUMENTS

JP   2004-182548   7/2004

OTHER PUBLICATIONS $2^{ND}$ Korea-Japan Symposium on Carbon Nanotube, 1P-05 (Nov. 27, 2005).
Abstracts The $30^{th}$ Commemorative Fullerene-Nanotubes General Symposium, 2P-20 (Jan. 7-9, 2006).
Euroconference on Electronic Properties of Novel Materials, Molecular Nanostructures (4.3-11.3.2006).
Nanotube 2006, Invited Talk-001 (Jun. 18-23, 2006).
T. Yamada et al.,"Size-Selective Growth of Double-Walled Carbon Nanotube Forests from Engineered Iron Catalysts", Nature Nanotechnology, vol. 1, pp. 131-136, Nov. 2006.
F. Li et al., "Characterization of single-wall carbon nanotubes by $N_2$ adsorption", Carbon (2004), vol. 42, pp. 2375-2383.
Zhu et al., A mechanism for carbon nanosheet formation, Carbon, 45, Jun. 2007, p. 2229-2234.
Murakami et al., Growth of vertically aligned SWNT films on quartz substrates and their optical anisotropy, Chemical Physics Letters, Jan. 2004, 385, p. 298-303.
Hata et al., Water-assisted highly efficient synthesis of impurity free SWNTs, Science, Nov. 2004, 306, p. 1362-1364.
Geng et al., Opening and closing of SWNTs, Chemical Physics Letters, No month 2004, p. 109-113.

Isothermal curve for liquid nitrogen adsorption and desorption

Density = 0.0362 g/cm³

Substrate   Catalyst patterned on substrate   Growth by water addition method

Apparatus 1 – Supply of oxidizing agent containing gas

Apparatus 2 - Supply of oxidizing agent-containing gas using bubbler

Apparatus 3 - Spray of oxidizing gas containing solution/gas

Apparatus 4 - Supply of oxidizing agent containing gas by injection syringe or the like Apparatus 5 - Supply of solid, solution oxidizing gas by gasification Aligned single-walled CNT bulk structure Heat source IC heat dissipation Final product image Aligned single-walled CNT bulk structure Low temperature fluid inlet High temperature fluid inlet Heat exchange for airplane High temperature fluid exit Low temperature fluid exit Aligned single-walled CNT bulk structure In via wiring LSI Via wirings in LSI Pattern vertically aligned SWNT structure Schematic view for aligned SWNT structure polarizer Reinforced single-walled carbon nanotube fiber Reinforced single-walled carbon nanotube bulk structure Vertically aligned SWNT structure Electrode 2 min (a)

15 min (b)

FIG. 47

| Current density (mA/g) | Capacitance (F/g) | | IR drop (mV) | |
|---|---|---|---|---|
| | Cation side | Anion side | Cation side | Anion side |
| 50 | 47.8 | 44.5 | 20 | 22 |
| 100 | 48.3 | 46.2 | 40 | 42 |
| 500 | 53.9 | 44.2 | 200 | 200 |
| 1000 | 53.4 | 38.9 | 400 | 380 |

Charge: 3V → 0V

Discharge: 0V → 3V

SINGLE-WALLED CARBON NANOTUBE AND ALIGNED SINGLE-WALLED CARBON NANOTUBE BULK STRUCTURE, AND THEIR PRODUCTION PROCESS, PRODUCTION APPARATUS AND APPLICATION USE

This application is a Divisional of U.S. application Ser. No. 11/658,577, filed Apr. 5, 2007 now U.S. Pat. No. 7,854,991, which is a national stage application of International application No. PCT/JP2005/014239, filed Jul. 27, 2005.

TECHNICAL FIELD

The present invention relates to a carbon nanotube (CNT) and an aligned single-walled carbon nanotube bulk structure, as well as their production process, production apparatus and application use and, more specifically, it relates to a carbon nanotube and an aligned single-walled carbon nanotube bulk structure attaining high purity, high specific surface area, large scale, and patterning, not found so far, and their production process, apparatus, and use.

BACKGROUND ART

For carbon nanotubes (CNT) for which development of functional materials has been expected as new electronic device materials, optical device materials, conductive materials, bio-related materials, etc., studies have been progressed earnestly for yield, quality, use, productivity, production process, etc.

One of methods for producing carbon nanotubes includes a chemical vapor deposition (CVD) method (hereinafter also referred to as a CVD method) and the method has attracted attention as being suitable to mass synthesis. The CVD method has a feature of bringing a carbon compound as a carbon source into contact with fine metal particles as a catalyst at a high temperature of about 500° C. to 1,000° C., and various variations are possible depending on the kind and the arrangement of the catalyst, kinds of carbon compounds, and conditions and production of single-walled carbon nanotube (SWCNT) and multi-walled carbon nanotube (MWCNT) is possible. Further, it has an advantage capable of growing by disposing the catalyst on a substrate.

However, in the production of the carbon nanotube according to the existent CVD method, since the catalyst or by-products intrude into the formed carbon nanotube, purifying treatment of applying various chemical treatments have been necessary in order to obtain a highly pure carbon nanotube from the product. The purification treatment includes a plurality of complicate and expensive processes, for example, an acid treatment in combination, and required considerable skills and increase in the cost of obtained products. Further, even when such purification treatment is applied, the purity is restricted to about 90 to 94 mass % and it was difficult to obtain a single-walled carbon nanotube at high purity of 98 mass/% or more (Nanoletters 2, 385 (2002)). Further, chemical and physical properties of the carbon nanotube often changed in purification making it difficult to easily obtain carbon nanotubes always at a determined quality.

Further, the growth of the carbon nanotubes by the existent CVD method involved a problem that the activity lifetime of the metal catalyst was short, the activity was degraded in several seconds to several tens seconds and the growth rate of the carbon nanotube was not so great, which hindered the productivity.

With the situations described above, it has been proposed a method of controlling the activity of the iron catalyst and the growth of the carbon nanotube by preparing a catalyst by dipping a substrate in an aqueous mixed solution of $FeCl_3$ and hydroxylamine (Hee Cheul Choi, et al., NANO LETTERS, Vol. 3, No. 2, 157-161 (2003)).

However, with all such a proposal, extension of the lifetime of the catalyst activity and increase in the growth rate have not yet been satisfactory also with a practical point of view at present.

On the other hand, among the carbon nanotubes, single-walled carbon nanotubes have attracted attention as a material for nano-electronic devices or nano-optical devices and energy storage in view of extremely excellent electrical property (extremely high maximum mixed current density), thermal property (heat conductivity comparable with diamond), optical property (light emission at an optical communication band wavelength), hydrogen storing performance, and metal catalyst supporting performance. In a case of effectively utilizing the single-walled carbon nanotube as the material for the nano-electronic devices, nano-optical devices, energy storage, etc., it is desired that aligned single-walled carbon nanotubes form a bulk structure in the form of an aggregate comprising aligned single-walled carbon nanotubes gathered in plurality, and the bulk structure provides electric, electronic, optical, and like other functionality. Further, such carbon nanotube bulk structures are desirably aligned in a predetermined direction, for example, as in vertical alignment, and the length (height) is desirably large scaled. As bulk structures in which a plurality of vertically aligned single-walled carbon nanotubes are gathered reported so far, those with a height reaching 4 μm have been reported (Chem. Phys. Lett. vol. 385, p. 298 (2004)).

By the way, for applying the vertically aligned single-walled carbon nanotubes for nano-electronic devices, nano-optical devices or energy storage in practical use, a further large scale is necessary.

Further, those having a plurality of vertically aligned carbon nanotubes formed into the bulk structure and patterned are extremely suitable to the application use for the nano-electronic devices, nano-optical devices, or energy storage as described above. However, while patterning has been attained in some multi-walled carbon nanotubes (Science 283, 412 (1999)), attainment of patterning for the single-walled carbon nanotubes has not yet been reported.

Compared with the multi-walled carbon nanotube, since the single-walled carbon nanotube is excellent in properties such as more excellent strength property, bending property, flexing property, higher optical transmittance, larger specific surface area, more excellent electron emitting property, more excellent electric conductivity and, further, presence of both semiconductors and metals while the multi-walled carbon nanotube is formed of a metal, it has been expected that when such vertically aligned single-walled carbon nanotube bulk structure is formed, application use to nano-electronic device, nano-optical device, energy storage, etc. will be increased outstandingly. However, the single-walled carbon nanotubes tend to be adhered intensely to each other because of a strong Van der Waals force and constitute a disordered and non-aligned bulk structure, for example, during purification for removing impurities and re-construction of once formed not-order and not-alignment bulk structure is extremely difficult, for example, due to the difficulty in dispersing the single-walled carbon nanotubes in a solution and, with the reasons, such a bulk structure has not yet been obtained at present.

DISCLOSURE OF THE INVENTION

With background described above, the present invention has an object to provide a carbon nanotube at high purity and high specific surface area (particularly, aligned single-walled carbon nanotube bulk structure) not found so far, as well as a production process and an apparatus therefore.

Further, another object of the present invention is to extend the life of a metal catalyst, realize the growth of a carbon nanotube at high growth rate efficiently and by simple and convenient means without using special organic materials such as hydroxylamine as in the proposed method described above, and provide a carbon nanotube also excellent in the mass productivity, as well as production process and apparatus therefor.

Further, other object of the present invention is to provide an aligned single-walled carbon nanotube bulk structure at a high purity, having a high specific surface area, and attaining an outstandingly large-scaled length or height, as well as a production process and an apparatus therefor.

Further, other object of the present invention is to provide an aligned single-walled carbon nanotube bulk structure attaining patterning, as well as a production process and an apparatus therefor.

Further, other object of the present invention is to apply a carbon nanotube at the high purity and high specific surface area, and the aligned single-walled carbon nanotube bulk structure attaining the high purity and high specific surface area, an outstandingly large-scaled length or height, as well as the aligned single-walled carbon nanotube bulk structure attaining the patterning described above to nano-electronic devices, nano-optical devices or energy storage.

This application provides the following inventions for solving the problems described above.

(1) A single-walled carbon nanotube, wherein the purity is 98 mass % or higher.

(2) A single-walled carbon nanotube according to the above (1), wherein the purity is 99 mass % or higher.

(3) A single-walled carbon nanotube according to the above (1) or (2), wherein the purity is 99.9 mass % or higher.

(4) A not-opened single-walled carbon nanotube, wherein the specific surface area is 600 $m^2/g$ or more and 1,300 $m^2/g$ or less.

(5) A not-opened single-walled carbon nanotube according to any one of the above (1) to (3), wherein the specific surface area is 600 $m^2/g$ or more and 1,300 $m^2/g$ or less.

(6) A not-opened single-walled carbon nanotube according to the above (4) or (5), wherein the specific surface area is 800 $m^2/g$ or more and 1,200 $m^2/g$ or less.

(7) An opened single-walled carbon nanotube, wherein the specific surface area is 1,600 $m^2/g$ or more and 2,500 $m^2/g$ or less.

(8) An opened single-walled carbon nanotube according to any one of the above (1) to (3), wherein the specific surface area is 1,600 $m^2/g$ or more and 2,500 $m^2/g$ or less.

(9) An opened single-walled carbon nanotube according to the above (7) or (8), wherein the specific surface area is 1,800 $m^2/g$ or more and 2,300 $m^2/g$ or less.

(10) A single-walled carbon nanotube according to any one of the above (1) to (9), wherein it is aligned.

(11) A single-walled carbon nanotube according to any one of the above (1) to (10), wherein it is vertically aligned on a substrate.

(12) A process for producing a carbon nanotube by a method of chemically vapor depositing (CVD) a carbon nanotube under the presence of a metal catalyst, wherein an oxidizing agent is added to a reaction atmosphere.

(13) A production process for a carbon nanotube according to the above (12), wherein the oxidizing agent is water vapor.

(14) A production process for a carbon nanotube according to the above (13), wherein 10 ppm or more and 10,000 ppm or less of water vapor are added.

(15) A production process for a carbon nanotube according to the above (13) or (14), wherein water vapor is added at a temperature of 600° C. or higher and 1,000° C. or lower.

(16) A production process for a carbon nanotube according to any one of the above (12) to (15), wherein the obtained carbon nanotube is single-walled.

(17) A production process for a carbon nanotube according to any one of the above (12) to (16), wherein vertically aligned carbon nanotube is grown on the substrate surface with a catalyst being disposed on the substrate.

(18) A production process for a carbon nanotube according to any one of the above (12) to (17) characterized by obtaining a carbon nanotube with a length of 10 μm or more.

(19) A production process for a carbon nanotube according to any one of the above (12) to (18) characterized by obtaining a carbon nanotube with a length of 10 μm or more and 10 cm or less.

(20) A production process for a carbon nanotube according to any one of the above (12) to (19), wherein carbon nanotube, after the growth, can be separated from the catalyst or the substrate without being exposed to a solution and a solvent.

(21) A production process for a carbon nanotube according to any one of the above (12) to (20), wherein a carbon nanotube at a purity of 98 mass % or higher is obtained.

(22) A production process for a carbon nanotube according to any one of the above (12) to (21), wherein a carbon nanotube at a purity of 99 mass % or higher is obtained.

(23) A production process for a carbon nanotube according to any one of the above (12) to (22), wherein a carbon nanotube at a purity of 99.9 mass % or higher is obtained.

(24) A production process for a carbon nanotube according to any one of the above (12) to (23) characterized by obtaining a not-opened single-walled with a specific surface area of 600 $m^2/g$ or more and 1,300 $m^2/g$ or less.

(25) A production process for a carbon nanotube according to any one of the above (12) to (24) characterized by obtaining a not-opened single-walled with a specific surface area of 800 $m^2/g$ or more and 1,200 $m^2/g$ or less.

(26) A production process for a carbon nanotube according to any one of the above (12) to (23) characterized by obtaining an opened single-walled with a specific surface area of 1,600 $m^2/g$ or more and 2,500 $m^2/g$ or less.

(27) A production process for a carbon nanotube according to any one of the above (12) to (23) and (26) characterized by obtaining an opened single-walled with a specific surface area of 1,800 $m^2/g$ or more and 2,300 $m^2/g$ or less.

(28) An aligned single-walled carbon nanotube bulk structure characterized by comprising a plurality of aligned single-walled carbon nanotubes with the height of 10 μm or more.

(29) An aligned single-walled carbon nanotube bulk structure according to the above (28), wherein the height is 10 μm or more and 10 cm or less.

(30) An aligned single-walled carbon nanotube bulk structure according to the above (28) or (29), wherein the purity is 98 mass % higher.

(31) An aligned single-walled carbon nanotube bulk structure according to any one of the above (28) to (30), wherein the purity is 99 mass % higher.

(32) An aligned single-walled carbon nanotube bulk structure according to any one of the above (28) to (31), wherein the purity is 99.8 mass/% higher.

(33) An aligned single-walled carbon nanotube bulk structure according to any one of the above (28) to (32), wherein the specific surface area is 600 $m^2/g$ or more.

(34) An aligned single-walled carbon nanotube bulk structure according to any one of the above (28) to (33), wherein the specific surface area is 800 m²/g or more and 2,500 m²/g or less.

(35) An aligned single-walled carbon nanotube bulk structure according to any one of the above (28) to (34), wherein the specific surface area is 1,000 m²/g or more and 2,300 m²/g or less.

(36) An aligned single-walled carbon nanotube bulk structure according to any one of the above (28) to (32) characterized by comprising not-opened single-walled carbon nanotubes with the specific surface area of 600 m²/g or more and 1,300 m²/g or less.

(37) An aligned single-walled carbon nanotube bulk structure according to any one of the above (28) to (32), and (36) characterized by comprising not-opened single-walled carbon nanotubes with the specific surface area of 800 m²/g or more and 1,200 m²/g or less.

(38) An aligned single-walled carbon nanotube bulk structure according to any one of the above (28) to (32) characterized by comprising opened single-walled carbon nanotubes with the specific surface area of 1,600 m²/g or more and 2,500 m²/g or less.

(39) An aligned single-walled carbon nanotube bulk structure according to any one of the above (28) to (32), and (38) characterized by comprising opened single-walled carbon nanotube with the specific surface area of 1,800 m²/g or more and 2,300 m²/g or less.

(40) An aligned single-walled carbon nanotube bulk structure according to any one of the above (28) to (39) characterized by having anisotropy in at least one of optical characteristics, electric characteristics, mechanical characteristics, magnetic characteristics, and thermal anisotropy between the alignment direction and direction vertical thereto.

(41) An aligned single-walled carbon nanotube bulk structure according to the above (40), wherein the magnitude of the anisotropy between the alignment direction and the direction vertical thereto is such that a larger value is 1:3 or more relative to the smaller value.

(42) An aligned single-walled carbon nanotube bulk structure according to the above (40) or (41), wherein the magnitude of the anisotropy between the alignment direction and the direction perpendicular thereto is such that a larger value is 1:5 or more relative to the smaller value.

(43) An aligned single-walled carbon nanotube bulk structure according to any one of the above (40) to (42), wherein the magnitude of the anisotropy between the alignment direction and the direction vertical thereto is such that a larger value is 1:10 or more relative to the smaller value.

(44) An aligned single-walled carbon nanotube bulk structure according to any one of the above (28) to (43), wherein it can be obtained with no exposure to a solution and a solvent.

(45) An aligned single-walled carbon nanotube bulk structure according to any one of the above (28) to (44), wherein the shape of the bulk structure is patterned into a predetermined shape.

(46) An aligned single-walled carbon nanotube bulk structure according to any one of the above (28) to (45) characterized by vertical alignment on the substrate.

(47) An aligned single-walled carbon nanotube bulk structure according to any one of the above (28) to (46), wherein the bulk structure is a thin film.

(48) A process for producing an aligned single-walled carbon nanotube bulk structure patterning a metal catalyst on a substrate and chemically vapor depositing (CVD) a plurality of single-walled carbon nanotubes so as to be aligned in a predetermined direction to the substrate surface under the presence of the metal catalyst to form a bulk structure, wherein an oxidizing agent is added to a reaction atmosphere.

(49) A production process for an aligned single-walled carbon nanotube bulk structure according to the above (48), wherein the oxidizing agent is water vapor.

(50) A production process for an aligned single-walled carbon nanotube bulk structure according to the above (49), wherein 10 ppm or more and 10,000 ppm or less of water vapor is added.

(51) A production process for an aligned single-walled carbon nanotube bulk structure according to the above (49) or (50), wherein water vapor are added at a temperature of 600° C. or higher and 1,000° C. or lower.

(52) A production process for an aligned single-walled carbon nanotube bulk structure according to any one of the above (48) to (51) characterized by obtaining a bulk structure with a height of 10 µm or more.

(53) A production process for an aligned single-walled carbon nanotube bulk structure according to any one of the above (48) to (52) characterized by obtaining a bulk structure with a height of 10 µm or more and 10 cm or less.

(54) A production process for an aligned single-walled carbon nanotube bulk structure according to any one of the above (48) to (53), wherein the shape of the bulk structure is controlled by the patterning of the metal catalyst and the growth of the carbon nanotube.

(55) A production process for an aligned single-walled carbon nanotube bulk structure according to any one of the above (48) to (54), wherein bulk structure, after the growth can be separated from the catalyst or the substrate without being exposed to a solution and a solvent.

(56) A production process for an aligned single-walled carbon nanotube bulk structure according to any one of the above (48) to (55) characterized by obtaining a bulk structure at a purity of 98 mass % or more.

(57) A production process for an aligned single-walled carbon nanotube bulk structure according to any one of the above (48) to (56) characterized by obtaining a bulk structure at a purity of 99 mass % or more.

(58) A production process for an aligned single-walled carbon nanotube bulk structure according to any one of the above (48) to (57) characterized by obtaining a bulk structure at a purity of 99.9 mass % or more.

(59) A production process for an aligned single-walled carbon nanotube bulk structure according to any one of the above (48) to (58) characterized by obtaining a bulk structure with a specific surface area of 600 m²/g or more.

(60) A production process for an aligned single-walled carbon nanotube bulk structure according to any one of the above (48) to (59) characterized by obtaining a bulk structure with a specific surface area of 800 m²/g or more and 2,500 m²/g or less.

(61) A production process for an aligned single-walled carbon nanotube bulk structure according to any one of the above (48) to (60) characterized by obtaining a bulk structure with a specific surface area of 1,000 m²/g or more and 2,000 m²/g or less.

(62) A production process for an aligned single-walled carbon nanotube bulk structure according to any one of the above (48) to (58) characterized by obtaining a bulk structure comprising not-opened single-walled carbon nanotubes with a specific surface area of 600 m²/g or more and 1,300 m²/g or less.

(63) A production process for an aligned single-walled carbon nanotube bulk structure according to any one of the above (48) to (58), and (62) characterized by obtaining a bulk structure comprising not-opened single-walled carbon nanotubes with a specific surface area of 800 m²/g or more and 1,200 m²/g or less.

(64) A production process for an aligned single-walled carbon nanotube bulk structure according to any one of the above (48) to (58) characterized by obtaining a bulk structure comprising opened single-walled carbon nanotubes with a specific surface area of 1,600 m²/g or more and 2,500 m²/g or less.

(65) A production process for an aligned single-walled carbon nanotube bulk structure according to any one of the above (48) to (58), and (64) characterized by obtaining a bulk structure comprising opened single-walled carbon nanotubes with a specific surface area of 1,800 m²/g or more and 2,300 m²/g or less.

(66) A production process for an aligned single-walled carbon nanotube bulk structure according to any one of the above (48) to (65) characterized by having anisotropy in at least one of optical characteristics, electric characteristics, mechanical characteristics, magnetic characteristics, and thermal anisotropy between the alignment direction and direction vertical thereto.

(67) A production process for an aligned single-walled carbon nanotube bulk structure according to the above (66), wherein the magnitude of the anisotropy between the alignment direction and the direction vertical thereto is such that a larger value is 1:3 or more relative to the smaller value.

(68) A production process for an aligned single-walled carbon nanotube bulk structure according to the above (66) or (67), wherein the magnitude of the anisotropy between the alignment direction and the direction vertical thereto is such that a larger value is 1:5 or more relative to the smaller value.

(69) A production process for an aligned single-walled carbon nanotube bulk structure according to any one of the above (67) and (68), wherein the magnitude of the anisotropy between the alignment direction and the direction vertical thereto is such that a larger value is 1:10 or more relative to the smaller value.

(70) A production process for an aligned single-walled carbon nanotube bulk structure according to any one of the above (48) to (69), wherein the alignment in the predetermined direction is vertical alignment.

(71) A separation apparatus of separating single-walled carbon nanotubes according to any one of the above (1) to (11), or aligned single-walled carbon nanotube, bulk structure according to any one of the above (28) to (47) from at least either of a substrate and a catalyst, which is provided with cutting means or suction means.

(72) A production process for carbon nanotubes characterized by the combination of a step of growing carbon nanotubes and a step of breaking by products that deactivate the catalyst.

(73) A production process for a carbon nanotube according to the above (72), wherein each of the steps is conducted in a gas phase or in a liquid phase.

(74) A carbon nanotube chemical vapor deposition apparatus characterized by the provision of water vapor supply means.

(75) A heat dissipation material characterized by using a single-walled carbon nanotube according to any one of the above (1) to (11), or an aligned single-walled carbon nanotube bulk structure according to any one of the above (28) to (47).

(76) A composite material characterized by containing a heat dissipation material according to the above (75).

(77) An article characterized by having a heat dissipation material according to the above (75).

(78) An article according to the above (77) comprising at least one member selected from electric products, electronic products, optical products, and mechanical products requiring heat dissipation.

(79) A heat conductive material characterized by using single-walled carbon nanotubes according to any one of the above (1) to (11), or an aligned single-walled carbon nanotube bulk structure according to any one of the above (28) to (47).

(80) A composite material characterized by containing a heat conductor according to the above (79).

(81) An article characterized by the provision of a heat conductor according to the above (80).

(82) An article according to the above (81) comprising at least one member selected from electric products, electronic products, optical products, and mechanical products requiring heat conduction.

(83) An electric conductor characterized by using single-walled carbon nanotubes according to any one of the above (1) to (11), or an aligned single-walled carbon nanotube bulk structure according to any one of the above (28) to (47).

(84) A composite material characterized by containing an electric conductor according to the above (83).

(85) An article characterized by the provision of an electric conductor according to the above (83).

(86) An article according to the above (85) comprising at least one member selected from electric products, electronic products, optical products, and mechanical products requiring electro conductivity.

(87) A wiring characterized by using an electric conductor according to the above (83).

(88) A wiring according to the above (87) wherein the wiring is a via wiring.

(89) An electronic part characterized by having the wiring according to the above (87) or (88).

(90) An optical device using single-walled carbon nanotubes according to any one of the above (1) to (11), or an aligned single-walled carbon nanotube bulk structure according to any one of the above (28) to (47).

(91) An optical device according to the above (90), wherein the optical device is a polarizer.

(92) A composite material characterized by containing an optical device according to the above (90) or (91).

(93) An optical product characterized by containing an optical device according to the above (90) or (91).

(94) A reinforcing material characterized by using single-walled carbon nanotubes according to any one of the above (1) to (11), or an aligned single-walled carbon nanotube bulk structure according to any one of the above (28) to (47).

(95) A reinforcing material according to the above (94), wherein single-walled carbon nanotubes or an aligned single-walled carbon nanotube bulk structure is formed as a laminate.

(96) A composite material characterized by containing a reinforcing material according to the above (94) or (95).

(97) A composite material according to the above (96), wherein at least one member selected from metals, ceramics, and resins is used as the base material.

(98) An electrode material characterized by using single-walled carbon nanotubes according to any one of the above (1) to (11), or an aligned single-walled carbon nanotube bulk structure according to any one of the above (28) to (47).

(99) A composite material characterized by containing an electrode material according to the above (98).

(100) A battery characterized by using an electrode material according to the above (98) as an electrode.

(101) A battery according to the above (100), wherein the battery is at least one member selected from secondary battery, fuel cell, and air cell.

(102) A capacitor or a super capacitor characterized by using single-walled carbon nanotubes according to any one of claims (1) to (11), or an aligned single-walled carbon nanotube bulk structure according to any one claims (28) to (47) as an electrode material or a constituent material.

(103) An electrode emission device characterized by using single-walled carbon nanotubes according to any one of the above (1) to (11), or an aligned single-walled carbon nanotube bulk structure according to any one of the above (28) to (47).

(104) An electric field emission type display characterized by the provision of an electron emission device according to the above (103).

(105) An absorbent characterized by using single-walled carbon nanotubes according to any one of the above (1) to (11), or an aligned single-walled carbon nanotube bulk structure according to any one of the above (28) to (47).

(106) A gas occlusion material characterized by using single-walled carbon nanotubes according to any one of the above (1) to (11), or an aligned single-walled carbon nanotube bulk structure according to any one of the above (28) to (47).

As has been described above, since the single-walled carbon nanotubes according to (first) to (11th) inventions of the application are suppressed for the intrusion of the catalyst, by-products, etc., improved in the purity and increased in the specific surface area compared with existent single-walled carbon nanotubes, they are extremely useful in the application use to nano-electronic devices, nano-optical devices, energy storage, etc.

Further, in the method according to (12th) to (27th) inventions of the application, the single-walled carbon nanotubes according to (first) to (11th) inventions can be produced by extremely simple and convenient means of adding an oxidizing agent such as water vapor to the reaction system and, in addition, the multi-walled carbon nanotubes having similar excellent properties can also be produced. Further, it is possible to extend the lifetime of the metal catalyst, attain the effective growth of carbon nanotubes at a high growth rate thereby enabling mass production, as well as the carbon nanotubes grown above the substrate can be peeled easily from the substrate or the catalyst.

Further, the aligned single-walled carbon nanotube bulk structures according to (28th) to (47th) inventions of the application are formed by assembling a plurality of aligned single-walled carbon nanotubes, have electric, electronic, optical and like other functionality, are suppressed with intrusion of the catalyst or by-products, enhanced for the purity and increased for the surface area, as well as remarkably large-scaled for the height thereof, and they can be expected for application use to nano-electronic devices, nano-optical devices, energy storage, etc., as well as various other application uses. Further, among the aligned single-walled carbon nanotube bulk structures according to the present invention, those patterned attain the patterning for the first time by the single-walled carbon nanotube assembly, and they were not present so far and can be expected for the same application as described above such as for nano-electronic devices, nano-optical device, energy storage, etc., as well as various other application uses.

Further, by the method according to (48th) to (70th) inventions of the application, the aligned single-walled carbon nanotube bulk structures according to (28th) to (47th) inventions can be produced by extremely simple and convenient means is addition of water vapor, i,e., to the reaction system. Further, it is possible to extent the lifetime of the metal catalyst and attain the efficient growth of the aligned single-walled carbon nanotube bulk structure at high growth rate, and the grown aligned single-walled carbon nanotube bulk structure can be peeled easily from the substrate or the catalyst.

Further, by the separation apparatus according to (71st) invention of the application, the single-walled carbon nanotube, particularly, the aligned single-walled carbon nanotube bulk structure can be separated from the substrate or the catalyst extremely simply and conveniently.

Further, by the method according to (72nd) or (73rd) inventions of the application, since the single-walled carbon nanotube and the single-walled aligned carbon nanotube can be produced efficiently without deactivating the catalyst for the long time and, in addition, not only the oxidation and combustion by the oxidizing agent but also by various kinds of processes such as chemical etching, plasmas, ion milling, microwave irradiation, UV-ray, and irradiation can be adopted and, in addition, any of gas phase or liquid phase process can be adopted, they have a great advantage of increasing the degree of freedom for the selection of the production processes.

Further, by the apparatus according to (74th) invention of the application, the single-walled carbon nanotube and the single-walled aligned carbon nanotube described above can be mass produced at a high efficiency irrespective of the simple and convenient structure.

Further, according to (75th) to (106th) inventions of the application, various application uses can be attained such as for heat dissipation materials, heat conductors, electric conductors, optical devices, reinforcing materials, electrode materials, batteries, capacitors or super capacitors, electron emission devices, adsorbents, and gas storages, as well as also to various other application uses.

BRIEF DESCRIPTION OF THE DRAWINGS

FIG. 47 shows a measured value for the charge/discharge characteristic of a super capacitor obtained in Example 6.

BEST MODE FOR CARRYING OUT THE INVENTION

Figure 1:
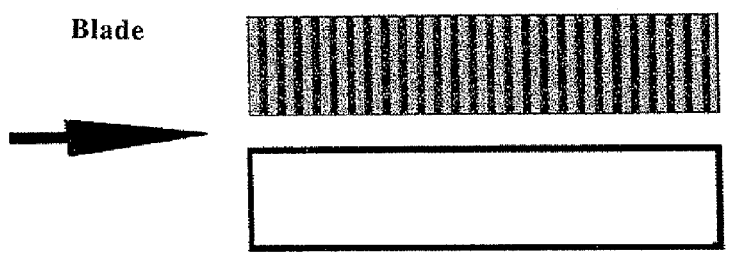
FIG. 1 is a schematic view for a separation apparatus used for separating an aligned single-walled carbon nanotube bulk structure from a substrate or a catalyst.

The present invention has the features as described above and there will be described embodiments thereof hereinafter.

At first, a single-walled carbon nanotubes according to (first) to (11th) inventions of the application will be described.

The single-walled carbon nanotube of the present invention has a feature in that the purity is 98 mass % or more, preferably, 99 mass % or more and, more preferably, 99.9 mass % or more.

The purity referred to in the specification is represented by the mass % of the carbon nanotube in the product. The purity is measured by the result of elemental analysis using fluorescence X-rays.

The single-walled carbon nanotube can be produced, for example, by the method of (12th) to (27th) inventions described above. Then, the obtained single-walled carbon nanotube has the high purity as described above. The purity is 98 mass % or more, preferably, 99 mass % or more and more preferably, 99.9 mass % or more. In a case of not conducting the purification treatment the purity of the as-grown, single-walled carbon nanotube coincides with the purity of the final product. A purification treatment may be applied optionally.

Further, the single-walled carbon nanotube of the present invention is not opened and has a specific surface area of 600 $m^2/g$ or more and 1,300 $m^2/g$ or less, preferably, 600 $m^2/g$ or more and 1,300 $m^2/g$ or less and, more preferably, 800 $m^2/g$ or more and 1,200 $m^2/g$ or less, or opened and has a specific surface area of 1,600 $m^2/g$ or more and 2,500 $m^2/g$ or less, more preferably, 1,600 $m^2/g$ or more and 2,500 $m^2/g$ or less and, further preferably, 1,800 $m^2/g$ or more and 2,300 $m^2/g$ or less. The single-walled carbon nanotube having such an extremely large specific surface area has not been present so far and can be obtained for the first time by the present invention.

Further, the single-walled carbon nanotube can be aligned and can be preferably aligned vertically above the substrate.

The vertically aligned single-walled carbon nanotube according to the present invention is suppressed for the intrusion of the catalyst or by-products, etc. and highly purified, and the purity for the final products has not been obtained so far. Further, in a case of the growth above the substrate, it can be easily peeled from the substrate or the catalyst.

As a method of peeling the single-walled carbon nanotube includes a method of physical, chemical, or mechanical peeling from the substrate and, for example, a method of peeling using, electric field, magnetic field, centrifugal force, or surface tension; a method of mechanically peeling from the substrate directly; and a method of peeling from the substrate by using pressure or heat can be used. A simple peeling method includes a method of picking-up and peeling directly from the substrate by a tweezers. More suitably, it can be separated by cutting from the substrate using a thin blade such as a cutter blade. Further, it can also be peeled by sucking from the substrate using a vacuum pump or a cleaner. Further, the catalyst remains on the substrate after peeling and a vertically aligned single-walled carbon nanotube can be grown newly by utilizing the same.

Accordingly, such a single-walled carbon nanotube is extremely useful in the application use to nano-electronic devices, nano-optical devices, energy storage, etc.

Figure 2:
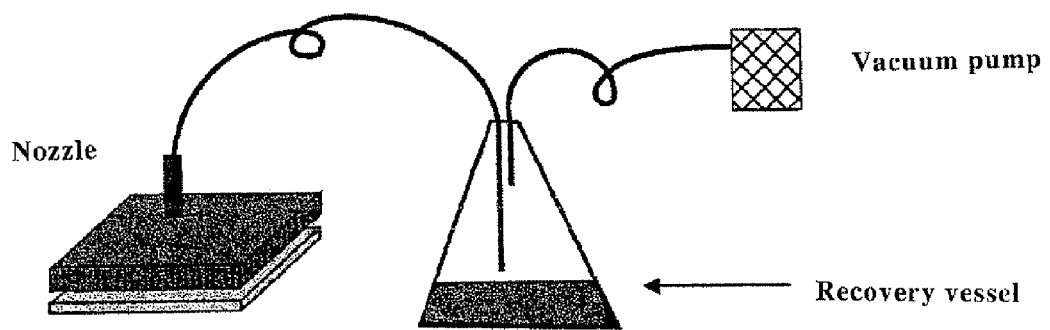
FIG. 2 is a schematic view for a separation apparatus used for separating an aligned single-walled carbon nanotube bulk structure from a substrate or a catalyst.

FIG. 1 and FIG. 2 schematically show typical examples of the apparatus for peeling and separating a single-walled carbon nanotube from a substrate or a catalyst.

Next, a process of producing a carbon nanotube according to (12th) to (27th) inventions of the application will be described.

The inventions concern a process for producing a carbon nanotube by CVD method and the constituent factor has a feature in that a metal catalyst is present in a reaction system and an oxidizing agent is added to a reaction atmosphere.

For the carbon compound as the starting carbon source, hydrocarbons, among all, lower hydrocarbons such as methane, ethane, propane, ethylene, propylene, and acetylene can be used suitably in the same manner as usual. One or two or more of them may be used and it may also be considered the use of an oxygen-containing compound with lower number of carbon atoms such as lower alcohols, for example, methanol or ethanol, acetone or carbon monoxide so long for this can be allowed as the reaction condition.

Any reaction atmospheric gas can be used so long as it does not react with the carbon nanotube and is inert at a growth temperature and includes, for example, helium, argon, hydrogen, nitrogen, neon, krypton, carbon dioxide, and chlorine, or a gas mixture of them and, particularly, helium, argon, hydrogen and a gas mixture thereof are preferred.

Any pressure can be applied for the reaction atmosphere, so long as it is within a range of any pressure at which carbon nanotubes have been produced so far and it is preferably $10^2$ Pa or higher and $10^7$ Pa (100 atm) or lower, more preferably, $10^4$ Pa or higher and $3\times10^5$ Pa (3 atm) or lower and, particularly preferably, $5\times10$ Pa or higher and $9\times10$ Pa or lower.

A metal catalyst is present in the reaction system described above and any catalyst can be used properly so long as it has been used so far for the production of carbon nanotubes and includes, iron chloride thin film, and iron thin film, iron-molybdenum thin film, alumina-iron thin film, alumina-cobalt thin film, alumina-iron-molybdenum thin film, prepared by sputtering.

As the existent amount of the catalyst, it can be used within a range of the amount by which carbon nanotubes have been produced so far. In a case of using the iron metal catalyst, the thickness is preferably 0.1 nm or more, and 100 nm or less, more preferably, 0.5 nm or more and 5 nm or less and, particularly preferably, 1 nm or more and 2 nm or less.

For disposing the catalyst, any appropriate method such as sputtering vapor deposition can be used so long as it is a method of disposing the metal catalyst with the thickness as described above. Further, a great amount of single-walled carbon nanotubes can be produced simultaneously by utilizing patterning for the metal catalyst to be described later.

While the temperature during the growth by CVD method can be properly determined by considering the reaction pressure, and the kind of the metal catalyst, the starting carbon source and the oxidizing agent, it is desirably set to such a temperature range as the effect for the addition of the oxidizing agent can be provided sufficiently. For the most desirable temperature range, the lower limit value is set to such a temperature that by-products of deactivating the catalyst, for example, amorphous carbon or graphite layer is removed by the oxidizing agent and the upper limit value is set to such a temperature that main products, for example, carbon nanotubes are not oxidized by the oxidizing agent. Specifically, in a case of water, it is preferably from 600° C. or higher and 1,000° C. or lower and, it is effectively 650° C. or higher and 900° C. or less. In a case of oxygen, it is 650° C. or lower, preferably, 550° C. or lower. In a case of carbon dioxide, it is effectively 1,200° C. or lower and, more preferably, 1,100° C. or lower.

Figure 3:
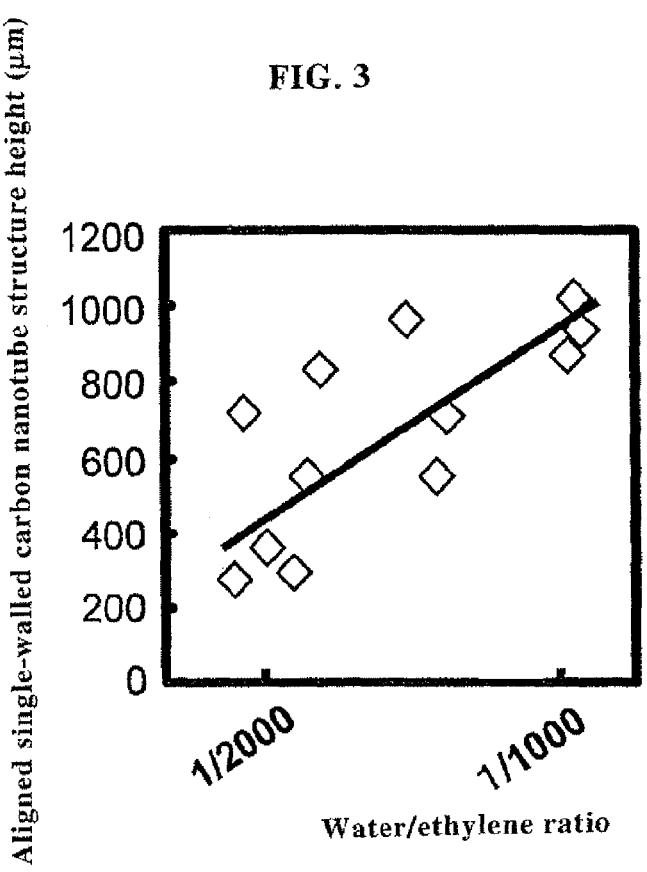
FIG. 3 is a graph showing a relation between the water addition amount and the height of the aligned single-walled carbon nanotube bulk structure.

Then, the addition of the oxidizing agent as one of features in the present invention has an effect of improving the activity of the catalyst during CVD growth reaction and extending the activity lifetime. By the synergistic effect, the carbon nanotubes formed is increased greatly as a result. FIG. 3 shows a graph for quantitatively evaluating the addition amount of the oxidizing agent (water), and the activity and the lifetime of the catalyst (catalyst: iron thin film; starting gas: ethylene). It can be seen that the catalyst activity is improved greatly and the catalyst lifetime is extended by the addition of the oxidizing agent (water). In a case of not adding water, the catalyst activity and the catalyst lifetime are decreased by so much as quantitative evaluation becomes extremely difficult.

Figure 4:
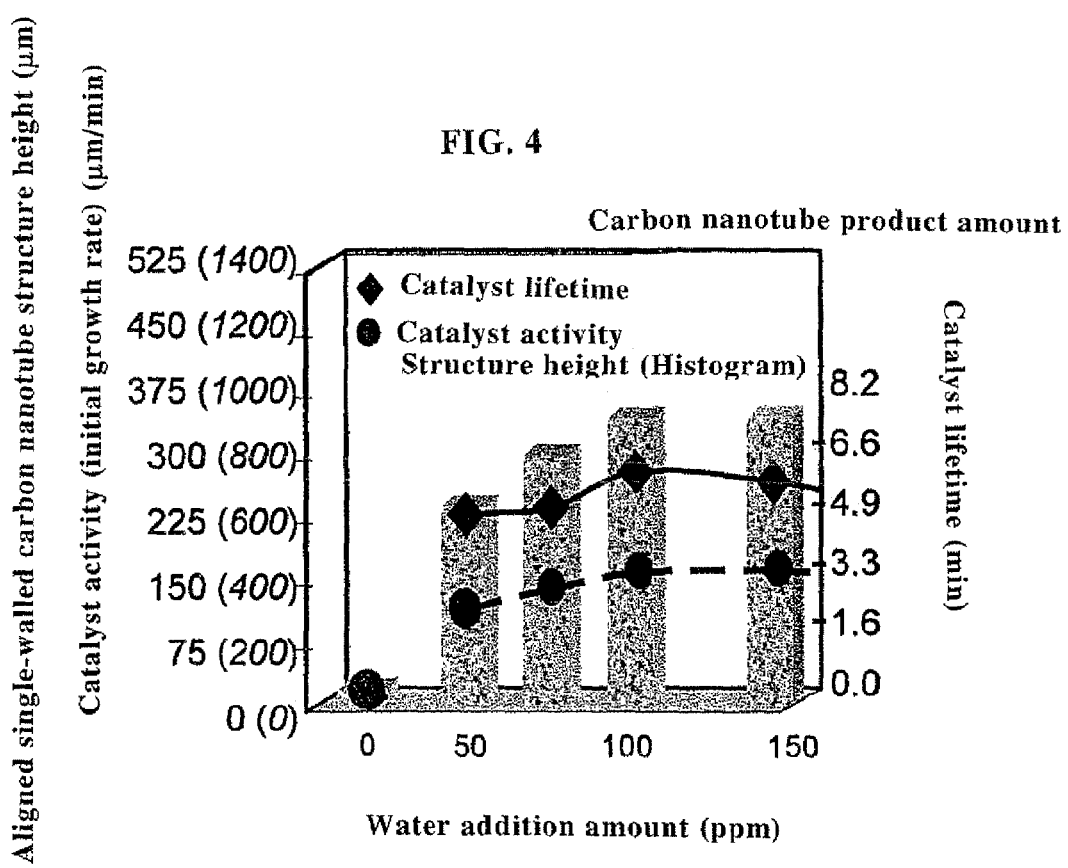
FIG. 4 is a graph showing a relation between the water addition amount, and the height of the aligned single-walled carbon nanotube, the catalyst activity, and the catalyst life.

FIG. 4 shows an example of a relation between the addition amount of the oxidizing agent (water) and the height of the vertically aligned single-walled carbon nanotube bulk structure (amount of formed single-walled carbon nanotube). It can be seen that the height of the vertically aligned single-walled carbon nanotube bulk structure is greatly increased by the addition of the oxidizing agent (water). This shows that the single-walled carbon nanotube is formed more efficiently by the addition of the oxidizing agent (water). One of the most prominent features according to the present invention is that the catalyst activity, the catalyst lifetime, and the height thereof as the result thereof are increased remarkably by the addition of the oxidizing agent (water). The finding that the height of the vertically aligned single-walled carbon nanotube bulk structure increases remarkably was not known at all before the present invention, which is an epoch-making matter found for the first time by the inventors of the present invention.

While the function of the oxidizing agent added in the present invention is not apparent at present, it may be considered as described below.

Figure 5:
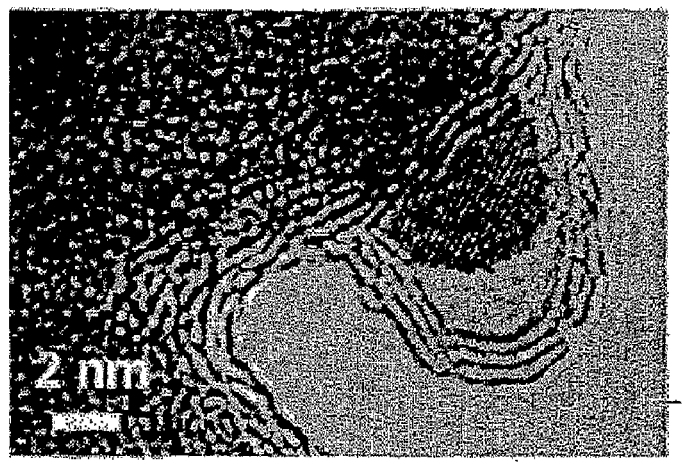
FIG. 5 is a view showing the state of a catalyst deactivated by products observed by an electron microscopic photograph.

In the usual growth process for the carbon nanotube, the catalyst is covered during the growth with by-products such as amorphous carbon or graphite layer resulted during the growth, by which the catalyst activity is lowered, the lifetime is shortened and it is rapidly deactivated. FIG. 5 shows high-resolution electron microscopic images of a catalyst with which the growth of the carbon nanotube has been failed. The catalyst failed for the growth the carbon nanotube is completely covered with by-products formed during the growth such as amorphous carbon or graphite layer. The catalyst is deactivated when the by-products cover the catalyst. However, it is estimated that when the oxidizing agent is present, the by-products formed during the growth such as amorphous carbon or graphite layers are oxidized and converted into CO gas or the like and removed from the catalyst layer, by which the catalyst activity is enhanced, the catalyst lifetime is extended and, as a result, the growth of the carbon nanotube promotes efficiently, and a vertically oriented single-walled carbon nanotube bulk structure with remarkably increased height is obtained.

As the oxidizing agent, water vapor, oxygen, ozone, hydrogen sulfide, acid-gas, as well as lower alcohols such as ethanol and methanol, oxygen-containing compounds with the less number of carbon atoms such as carbon monoxide and carbon dioxide, and a gas mixture thereof are also effective. Among them, water vapor, oxygen, carbon dioxide, and carbon monoxide are preferred and, particularly, water vapor is used preferably.

The addition amount is not particularly restricted and may be a very small amount. For example, in a case of water vapor, it is usually 10 ppm or more and 10,000 ppm or less, more preferably, 50 ppm or more and 1,000 ppm or less and, further preferably, 200 ppm or more and 700 ppm or less. With a view point of preventing the degradation of the catalyst and enhancement of the catalyst activity due to the addition of water vapor, the addition amount in a case of water vapor is desirably within a range as described above.

By the addition of the oxidizing agent, the growth of the carbon nanotube which has been completed so far in about 2 min at the longest continues for several tens minutes and the growth rate increases by 100 times or more and, further, 1,000 times or more compared with the usual case.

While the method according to the present invention can produce single-walled and multi-walled carbon nanotubes, it particularly provides an effect for the production of the single-walled carbon nanotube. Then, while description is to be made for the single-walled carbon nanotube, it is identical also for the multi-walled carbon nanotube.

In the method according to the present invention, the catalyst is disposed on the substrate and the single-walled carbon nanotube vertically aligned to the substrate surface can be grown. In this case, appropriate substrates can be used properly so long as they have been used so far for the production of the carbon nanotubes and include, for example, those described below.

(1) Metals and semiconductors such as iron, nickel, chromium, molybdenum, tungsten, titanium, aluminum, manganese, cobalt, copper, silver, gold, platinum, niobium, tantalum, lead, zinc, gallium, germanium, indium, gallium, germanium, arsenic, indium, phosphorus, and antimony; alloys thereof; and oxides of such metals and alloys.

(2) Thin films, sheets, plates, powders and porous materials of the metals, alloys, and oxides described above.

(3) Non-metals such as silicon, quartz, glass, mica, graphite and diamond; ceramics, wafers and thin films thereof.

A preferred range for the height (length) of the vertically aligned single-walled carbon nanotube produced by the process according to the present invention is different depending on the application use, and the lower limit is, preferably, 10 μm and, more preferably, 20 μm and, particularly preferably, 50 μm. While the upper limit is not particularly restricted, it is preferably 2.5 mm, further preferably, 1 cm and, particularly preferably, 10 cm with a practical view point of use.

The single-walled carbon nanotube produced by the method according to the present invention is remarkably different from single-walled carbon nanotubes produced by existent CVD method in view of the purity. That is, the single-walled carbon nanotube produced by the method according to the present invention is at a high purity of 98 mass % or higher, preferably, 99 mass % or higher and, more preferably, 99.9 mass % or higher. In addition, in a case of the growth above the substrate, it can be peeled easily from the substrate or the catalyst. As the method and the apparatus for peeling the single-walled carbon nanotube, the method described previously is adopted.

The single-walled carbon nanotube produced by the method according to the present invention may also be applied optionally with the same purification treatment as in the usual case.

Further, the single-walled carbon nanotube produced by the method according to the present invention includes those not opened and having the specific surface area of 600 $m^2/g$ or more and 1,300 $m^2/g$ or less, more preferably, 600 $m^2/g$ or more and 1,300 $m^2/g$ or less and, further preferably, 800 $m^2/g$ or more and 1,200 $m^2/g$ or less, or those opened and having the specific surface area of 1,600 $m^2/g$ or more and 2,500 $m^2/g$ or less, more preferably, 1,600 $m^2/g$ or more and 2,500 $m^2/g$ or less and, further preferably, 1,800 $m^2/g$ or more and 2,300 $m^2/g$ or less, and it has an extremely large specific surface area.

While the method according to the present invention requires means for supplying the oxidizing agent, the reaction apparatus, the constitution and the structure of the reaction furnace for CVD method are not restricted particularly. Specific embodiments will be described later.

Next, aligned single-walled carbon nanotube bulk structures according to (28th) to (47th) inventions of the application will be described.

The aligned single-walled carbon nanotube bulk structures according to (28th) to (47th) inventions of the application have a feature in comprising a plurality of aligned single-walled carbon nanotubes, with a height of 10 µm or more.

"Structure" referred to the specification of the application comprises aligned single-walled carbon nanotubes gathered in plurality and provides electric/electronic, optical and like other functionality. The aligned single-walled carbon nanotube bulk structure can be produced for example by the method of the (48th) to (70th) and (72nd) to (73rd) inventions described above.

The aligned single-walled carbon nanotube bulk structure has a purity of 98 mass % or higher, more preferably, 99 mass % or higher, and, particularly preferably, 99.9 mass % or higher. In a case of not conducting the purification treatment, the purity of the as-grown, aligned single-walled carbon nanotube bulk structure coincides with the purity for the final product. A purification treatment may optionally be conducted. The aligned single-walled carbon nanotube bulk structure can be put to predetermined alignment and, preferably, can be aligned vertically above the substrate.

While a preferred range for the height (length) of the aligned single-walled carbon nanotube bulk structure according to the present invention is different depending on the application use, in a case where it is used in a large scale, the lower limit is, preferably, 10 µm, more preferably, 20 µm and, particularly preferably, 50 µm, and the upper limit is, preferably, 2.5 µm, more preferably, 1 cm and, particularly preferably, 10 cm.

As described above, the aligned single-walled carbon nanotube bulk structure according to the present invention is suppressed for the intrusion of the catalyst or the by-products, etc. and improved for the high purity, and the purity as the final product was not found so far.

Further, since the aligned single-walled-carbon nanotube bulk structure according to the present invention is greatly large-scaled also for the height, various application uses can be expected in addition to the application to nano-electronic devices, nano-optical devices, energy storage, etc. as to be described later.

Further, while the specific surface area of the aligned single-walled carbon nanotube bulk structure according to the present invention is extremely large and a preferred value is different in accordance with the application use thereof, it is 600 m$^2$/g or more, more preferably, 800 m$^2$/g or more and 2,500 m$^2$/g or less and, more preferably, 1,000 m$^2$/g or more and 2,300 m$^2$/g or less in a case of the application use for which a large specific surface area is desired. Further, the single-walled carbon nanotube bulk structure according to the present invention has a specific surface area of 600 m$^2$/g or more and 1,300 m$^2$/g or less, more preferably, 600 m$^2$/g or more and 1,300 m$^2$/g or less and, further preferably, 800 m$^2$/g or more and 1,200 m$^2$/g or less for those not opened. Further, the single-walled carbon nanotube bulk structure according to the present invention has a specific surface area of 1,600 m$^2$/g or more and 2,500 m$^2$/g or less, preferably, 1,600 m$^2$/g or more and 2,500 m$^2$/g or less and, further preferably, 1,800 m$^2$/g or more and 2,300 m$^2$/g or less for those opened. The single-walled carbon nanotube bulk structure having such an extremely large specific surface area has not been present in the usual case and can be obtained for the first time according to the present invention.

The aligned single-walled carbon nanotube bulk structure having such a large specific surface area has a significant advantage in various application uses such as heat dissipation bodies, electrode materials, super capacitors, fuel cells, adsorbents, filters, actuators (artificial muscles), sensors, humidity controllers, and heat insulating agents.

Figure 6:
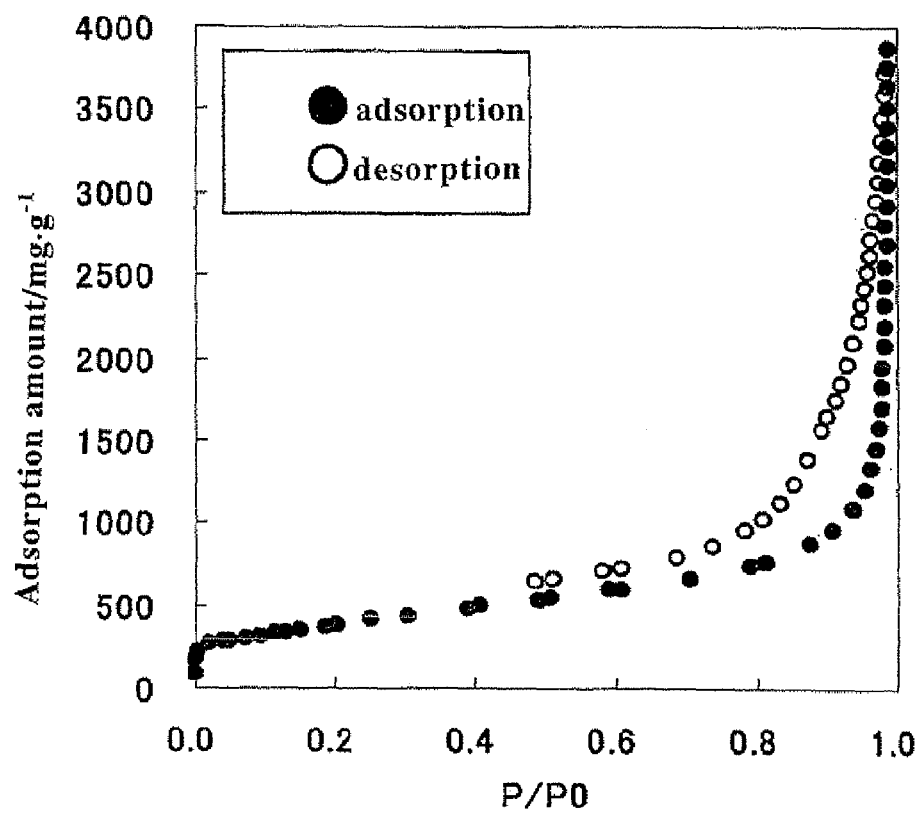
FIG. 6 shows liquid nitrogen absorption/desorption isothermal curves of aligned single-walled carbon nanotube bulk structures.

Measurement for the specific surface area can be carried out by measurement for adsorption-desorption isothermal curves. As an example, for 30 mg of an aligned single-walled carbon nanotube bulk structure just after the growth (as-grown) was measured for the adsorption-desorption isothermal curves for liquid nitrogen at 77 K by using BELSORP-MINI manufactured by Bel Japan Inc. (adsorption equilibrium time: 600 sec). The total adsorption amount showed an extremely large value (1,650 m$^2$/g) (see FIG. 6). When the specific surface area was measured from the adsorption-desorption isothermal curves, it was 110 m$^2$/g. Further, a linear adsorption-desorption isothermal curve was obtained in a relative pressure range of 0.5 or less and it can be seen therefrom that the carbon nanotubes are not opened in the aligned single-walled carbon nanotube bulk structure.

Further, in the aligned single-walled carbon nanotube bulk structure according to the present invention, for example, as shown in Example 8 to be described later, its top end portion is opened and the specific surface area can be increased more by applying an opening treatment. In Example 8, an extremely large specific surface area as large as 2,000 m$^2$/g can be attained. For the opening treatment, a treatment with oxygen can be used as a dry process. In a case that a wet process can be used, an acid treatment, specifically, a refluxing treatment with hydrogen peroxide or a cutting treatment with hydrochloric acid at high temperature can be used. Further, the aligned single-walled carbon nanotube bulk structure applied with the opening treatment shows a convex type absorption-desorption isothermal curves in a relative pressure region of 0.5 for less (see FIG. 49). It can be seen from this that carbon nanotubes in the aligned single-walled carbon nanotube bulk structure are opened.

On the contrary, the specific surface area of the single-walled carbon nanotube is 524 m$^2$/g, for example, in Nano Letters 2, p. 385-388 (2002), and 567 m$^2$/g in Chemical Physics Letters 365, p 69-74 (2002), and the specific surface area of the existent aligned multi-walled carbon nanotube bulk structure only shows the value of about 200 to 300 m$^2$/g at most (Journal of Colloid and Interface Science 277, p 35-42 (2004)).

From the foregoings, it can be seen that the known aligned single-walled carbon nanotube bulk structure according to the present invention has the maximum specific surface area to be noted particularly among the single-walled carbon nanotubes reported so far in the state as grown or after the opening treatment.

Accordingly, since the aligned single-walled carbon nanotube bulk structure according to the present invention has an extremely large surface area compared with existent one, it is extremely prospective as heat dissipation bodies, electrode materials, super capacitors, fuel cells, adsorbents, filters, actuators (artificial muscles), sensors, humidity controllers, heat insulating agent, etc.

Further, since the aligned single-walled carbon nanotube bulk structure according to the present invention has an alignment property, it shows anisotropy between the direction of alignment and the direction vertical thereto in at least one of optical property, electrical property, mechanical property, magnetic property, and thermal property. The degree of anisotropy between the direction of alignment and the direction vertical thereto in the single-walled carbon nanotube bulk structure is, preferably, 1:3 or more, more preferably, 1:5 or more and, particularly preferably, 1:10 or more. The upper limit value is about 1:100. For example, in the case of the optical property, such large anisotropy enables application to a polarizer by utilizing the polarization dependency of the light absorbance, or light transmittance. Also for the anisotropy in other properties than described above, application to various articles such as heat exchangers, heat pipes, reinforcing materials etc. by utilizing the anisotropy thereof respectively.

Further, the aligned single-walled carbon nanotube bulk structures according to the present invention show constant density even when the height is different. Usually, the value falls within a range from 0.002 to 0.2 g/cm$^3$, which can be controlled by controlling the density of the catalyst.

Figure 7:
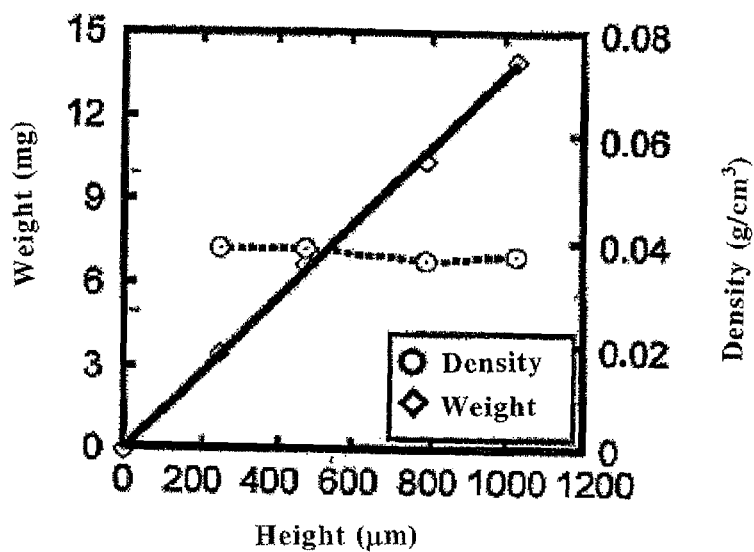
FIG. 7 shows height-weight and height-density curves of an aligned single-walled carbon nanotube bulk structure.

FIG. 7 shows an example for height-weight and height-density curves of an aligned single-walled carbon nanotube bulk density. It can be seen from FIG. 7 that the weight of the aligned single-walled carbon nanotube bulk structure according to the present invention increase in proportion with the height, and the density of the aligned single-walled carbon nanotube bulk structure is constant irrespective of the height (0.036 g/cm$^3$).

Accordingly, the aligned single-walled carbon nanotube bulk structure according to the present invention is an extremely homogeneous material, and application use as heat dissipation sheets, heat conduction sheets, and heat exchangers can be expected.

Further, in the example of the single-walled carbon nanotube bulk structure according to the present invention, the content of the single-walled carbon nanotube (filament) shows an extremely high value of 99.5% or more under electron microscopic observation.

Further, the single-walled carbon nanotube bulk structure according to the present invention contains therein single-walled carbon nanotubes (filaments) of high quality.

Figure 8:
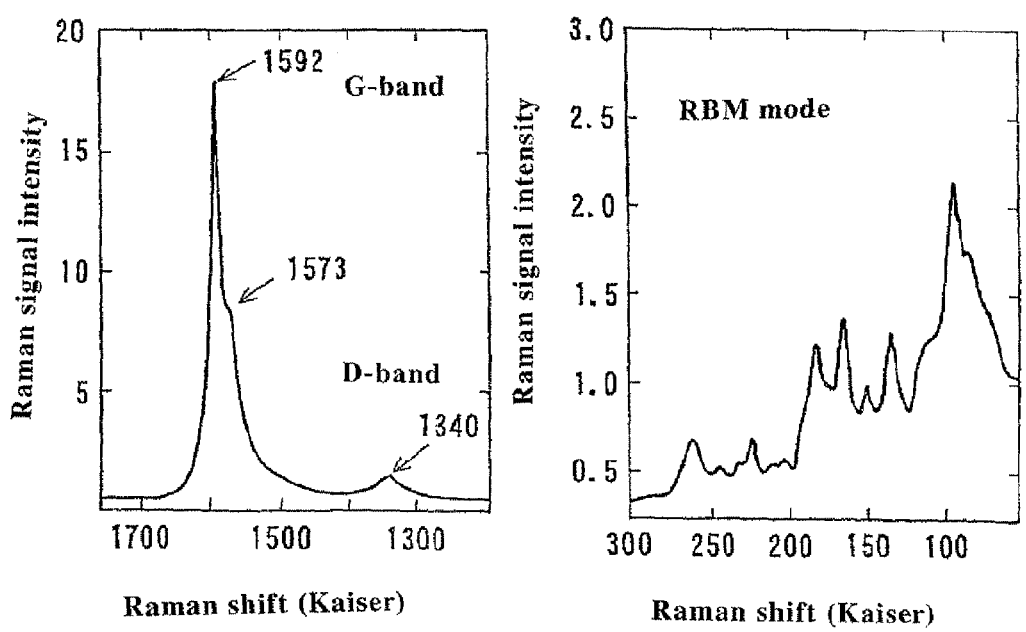
FIG. 8 is a graph showing the result of measurement for Raman spectrum of a carbon nanotube in an aligned single-walled carbon nanotube bulk structure.

The quality of the single-walled carbon nanotubes (filaments) in the aligned single-walled carbon nanotube bulk structure can be evaluated by measurement of the Raman spectrum. FIG. 8 shows an example for the measurement of the Raman spectrum. From FIG. 8, a G-band having a sharp peak is observed at 1592 Kaiser and it can be seen that a graphite crystal structure is present. Further, since the D-band is small, it can be seen that a graphite layer with less defects at high quality is present. Further, on the side of a low wavelength, an RBM mode attributable to a plurality of single-walled carbon nanotubes is observed and it can be seen that the graphite layer is a single-walled carbon nanotube. From the foregoings, it has been confirmed that single-walled carbon nanotubes at high quality are present in the single-walled carbon nanotube bulk structure according to the present invention.

Further, the size of the mono-carbon nanotube (filament) in the single-walled carbon nanotube bulk structure according to the present invention shows a broad size distribution from 0.8 to 6 nm, and the center size is from 1 to 4 nm. The size distribution and the center size can also be controlled by the preparation of the catalyst.

Figure 9:
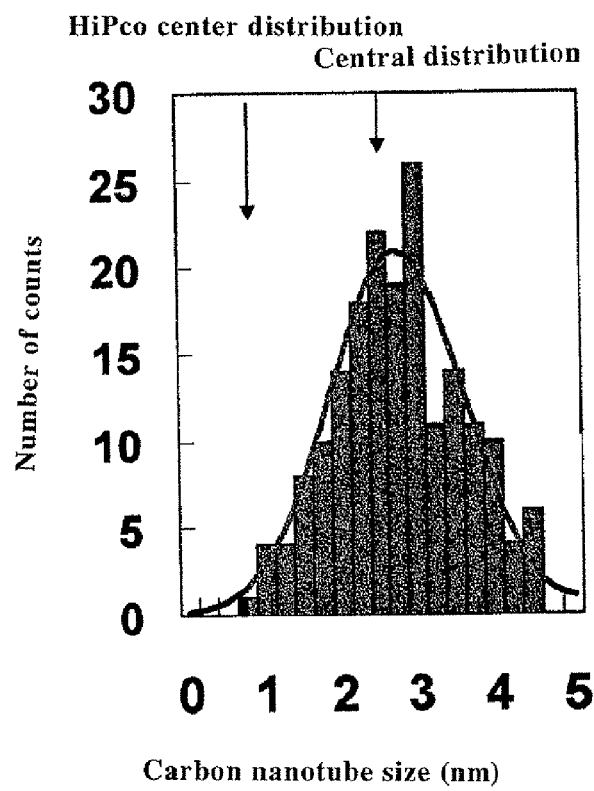
FIG. 9 is a graph showing the result of measurement for the size distribution of carbon nanotubes in an aligned single-walled carbon nanotube bulk structure.

The size distribution of the single-walled carbon nanotube (filament) can be evaluated by a high-resolution electron microscope. That is, the size distribution can be obtained by measuring the size on every single-walled carbon nanotubes from the electron microscopic photograph, preparing a histogram and conducting calculation based on the prepared histogram. FIG. 9 shows an example for the evaluation of the size distribution. It has been confirmed from FIG. 9 that the single-walled carbon nanotubes in the aligned single-walled carbon nanotube bulk structure show a broad size distribution from 1 to 4 nm and the center size is 3 nm.

It has been found that the size distribution is extremely larger compared with the center size of 1 nm for the single-walled nanotube prepared by an existent HiPco method and 1.5 nm for the single-walled carbon nanotube prepared by a laser abrasion method. A tube of a large size has a large inner space and can include bio-molecules such as DNA which could not be included so far and has extremely high utility as a new composite material.

The aligned single-walled carbon nanotube bulk structure can incorporate double-walled or multi-walled carbon nanotubes or further more layers of carbon nanotubes within a range not deteriorating the function thereof.

Further, the aligned single-walled carbon nanotube bulk structure according to the present invention can be formed into a shape patterned to a predetermined shape. Those in which a plurality of aligned multi-walled carbon nanotubes are aggregated and the shape is patterned to a predetermined shape were not present so far, which have been attained for the first time according to the present invention. The patterning shape can be in various shapes such as thin film shape, as well as a columnar shape, prismatic shape, or complicated shape. The patterning can be controlled by the method as will be described later.

Then, a process for producing an aligned single-walled carbon nanotube bulk structure according to (48th) to (70th) inventions of the application will be described.

Figure 10:
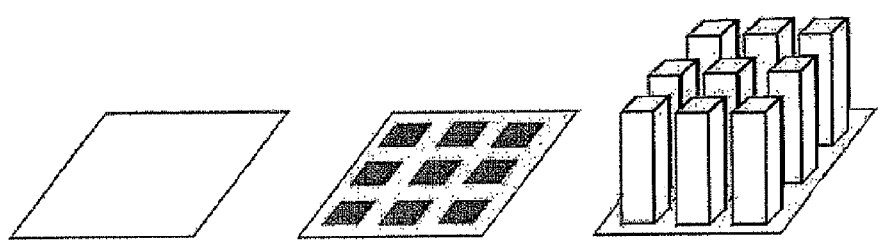
FIG. 10 is a view schematically showing the outline of a production process for a patterned vertically aligned single-walled carbon nanotube bulk structure.

The method according to the present invention concerns a method of producing an aligned single-walled carbon nanotube bulk structure by CVD method and the constituent factor comprises patterning a metal catalyst on a substrate, and chemically vapor depositing (CVD) a plurality of single-walled carbon nanotubes into a structure so as to be aligned in a predetermined direction to the substrate surface under the presence of the metal catalyst, in which an oxidizing agent is added to a reaction atmosphere. In this case, description is to be made mainly for the case of patterning the aligned single-walled carbon nanotube bulk structure. FIG. 10 schematically shows the outline for the step of the production process.

For the carbon compound as the starting carbon source, hydrocarbons, among all, lower hydrocarbons, for example, methane, ethane, propane, ethylene, propylene, acetylene, etc. can be used suitably in the same manner as in the case of the (12th) to (27th) inventions described above. One or two or more of them may be used and it may be also considered the use of lower alcohols such as methanol and ethanol, acetone, and oxygen-containing compounds with a low number of carbon atoms such as carbon monoxide.

Any gas can be used for the reaction atmospheric so long as it does not react with the carbon nanotube and is inert at a growth temperature and includes, for example, helium, argon, hydrogen, nitrogen, neon, krypton, carbon dioxide, chlorine, or a gas mixture of them and, particularly, helium, argon, hydrogen and a gas mixture thereof are preferred.

Any pressure can be applied for the reaction atmosphere, within a range of pressure at which carbon nanotubes have been produced so far, and it is preferably $10^2$ Pa or higher and $10^7$ Pa (100 atm) or lower, more preferably, $10^4$ Pa or higher and $3 \times 10^5$ Pa (3 atm) or lower and, particularly preferably, $5 \times 10$ Pa or higher and $9 \times 10$ Pa or lower.

The metal catalyst as described above is present in the reaction system and any appropriate catalyst can be used so long as it has been used so far for the production of the carbon nanotubes and includes, for example, iron chloride thin film, and iron thin film, iron-molybdenum thin film, alumina-iron thin film, alumina-cobalt thin film, and alumina-iron-molybdenum thin film, prepared by sputtering.

As the existent amount of the catalyst, it can be used within a range of the amount with which the carbon nanotubes were produced so far and in a case, for example, of using the iron metal catalyst, the thickness is, preferably, 0.1 nm or more, and 100 nm or less, more preferably, 0.5 nm or more and 5 nm or less and, particularly preferably, 1 nm or more and 2 nm or less. The area in which the catalyst is present can be set optionally in accordance with the size of the structure to the produced.

As the patterning method for the catalyst, any appropriate method can be used so long as it is a method capable of directly or indirectly patterning the metal catalyst, which may be a wet process or a dry process, and, for example, may be patterning by using a mask, patterning by using nano-imprinting, patterning by using soft lithography, patterning by using printing, patterning by using plating, and patterning by using screen printing, patterning using lithography, as well as a method of patterning other material to which the catalyst is adsorbed selectively on a substrate, and selectively adsorbing the catalyst to other material thereby preparing a pattern. A preferred method includes patterning by using lithography, metal vapor deposition photolithography using a mask, electron beam lithography, catalyst metal patterning by an electron beam vapor deposition method using a mask, and a catalyst metal patterning by a sputtering method using a mask.

Also for the substrate, identical kinds of substrates with those described for the (12th) to (27th) inventions can be used.

Also for the temperature during the growth reaction by the CVD method, identical temperature conditions with those described for (12th) to (27th) inventions described above may be selected.

Then, addition of the oxidizing agent as one of greatest features in the present invention has an effect of enhancing the activity of the catalyst during the CVD growth reaction and extending the activity life as described above.

As a result, formed carbon nanotubes increase remarkably by the synergistic effect and an vertically aligned single-walled carbon nanotube bulk structure with the height being increased remarkably can be obtained. The addition amount has no particular restriction but may be a very small amount. While it is different depending on the production condition, in a case of water vapor, for example, it is usually 10 ppm or more and 10,000 ppm or less, more preferably, 50 ppm or more and 1,000 ppm or less and, further preferably, 200 ppm or more and 700 ppm or less. The addition amount of the water vapor is desirably within the range as described above with a view point of preventing the degradation of the catalyst and improving the catalyst activity due to the water vapor addition.

By the addition of the oxidizing agent, the growth of the carbon nanotube, which was completed so far for about 2 min at the longest in usual case, continues for several tens minutes and the growth rate increase 100 times or more and, further, 1,000 times or more compared with the usual case.

While the preferred range of the height (length) of the aligned single-walled carbon nanotube bulk structure produced by the method according to the present invention is different in accordance with the application use, the lower limit is preferably 10 µm, more preferably, 20 µnm, and, particularly preferably, 50 µm. While the upper limit has no particular restriction, it is preferably 2.5 mm, more preferably, 1 cm and, particularly preferably, 10 cm.

The aligned single-walled carbon nanotube-bulk structure produced by the method according to the present invention is remarkably different from the aligned single-walled carbon nanotube bulk structure produced by the existent CVD method in view of the purity. That is, the aligned single-walled carbon nanotube-bulk structure produced by the method according to the present invention is at a purity of 98 mass % or higher, more preferably, 99 mass/% or higher and, particularly preferably, 99.9 mass % or higher and, in addition, in a case being grown on the substrate, it can be peeled easily from the substrate or the catalyst. As the peeling method, the same method as described in the case of (12th) to (27th) inventions described above can be used.

The aligned single-walled carbon nanotube-bulk structure produced by the method according to the present invention may be applied optionally with the same purification treatment as usual.

Further, the aligned single-walled carbon nanotube-bulk structure produced by the method according to the present invention is 600 $m^2/g$ or more, more preferably, 800 $m^2/g$ or more and 2,500 $m^2/g$ or less and, more preferably, 1,000 $m^2/g$ or more and 2,300 $m^2/g$ or less. Further, the single-walled carbon nanotube bulk structure according to the present invention has a specific surface area of 600 $m^2/g$ or more and 1,300 $m^2/g$ or less, more preferably, 600 $m^2/g$ or more and 1,300 $m^2/g$ or less, and, more preferably, 800 $m^2/g$ or more and 1,200 $m^2/g$ or less for those of not-opened structures. Further, the single-walled carbon nanotube bulk structure according to the present invention has a specific surface area of the 1,600 $m^2/g$ or more and 2,500 $m^2/g$ or less, more preferably, 1,600 $m^2/g$ or more and 2,500 $m^2/g$ or less and, further preferably, 1,800 $m^2/g$ or more and 2,300 $m^2/g$ or less those of opened structures.

Figure 11:
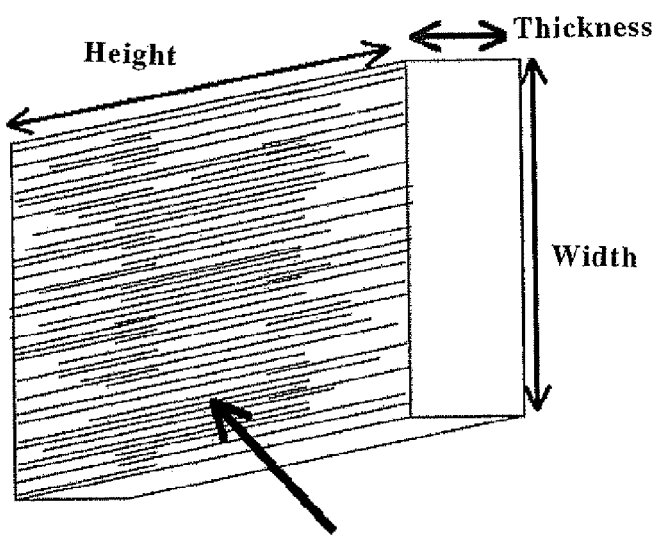
FIG. 11 is a view showing, as a model, a way of controlling an aligned single-walled carbon nanotube bulk structure.
Figure 12:
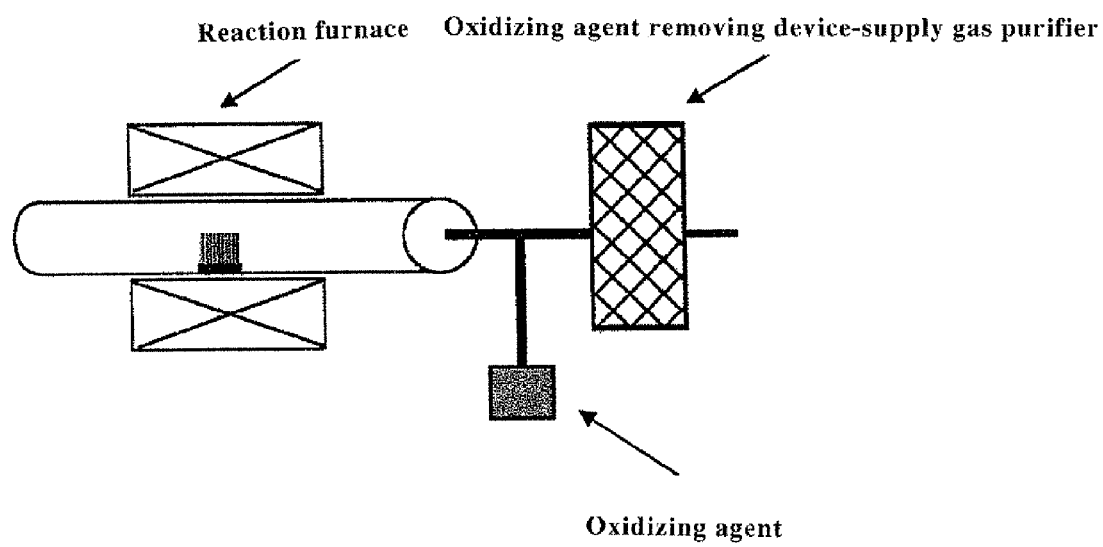
FIG. 12 is a schematic view of a production apparatus for a single-walled carbon nanotube or an aligned single-walled carbon nanotube bulk structure.
Figure 13:
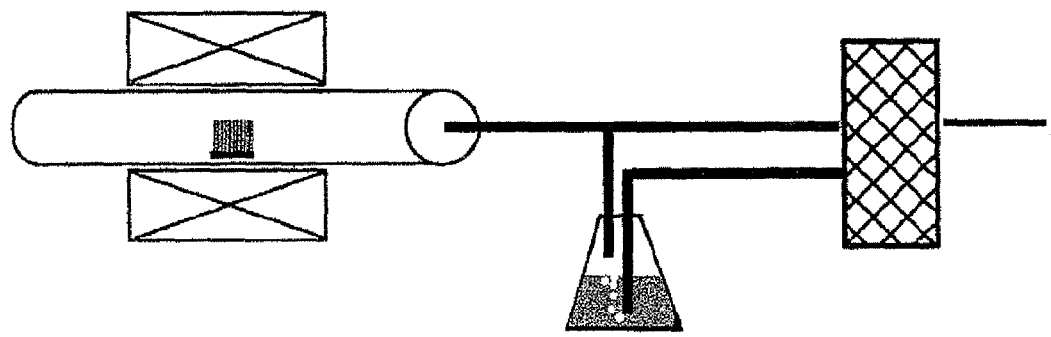
FIG. 13 is a schematic view of a production apparatus for a single-walled carbon nanotube or an aligned single-walled carbon nanotube bulk structure.
Figure 14:
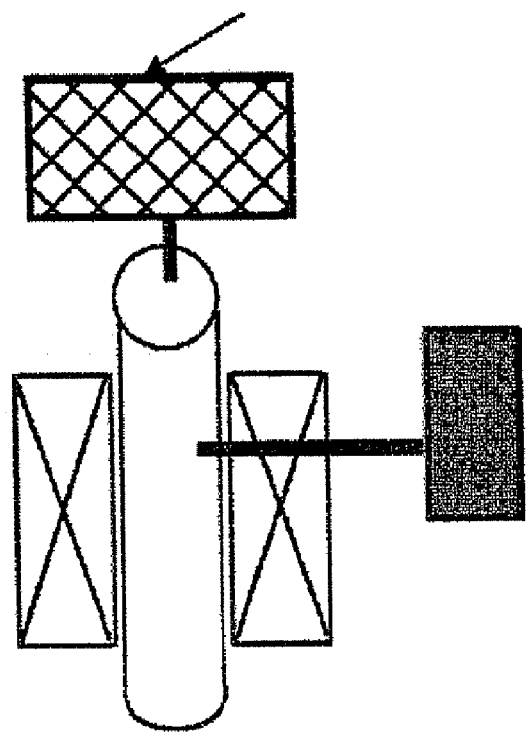
FIG. 14 is a schematic view of a production apparatus for a single-walled carbon nanotube or an aligned single-walled carbon nanotube bulk structure.
Figure 15:
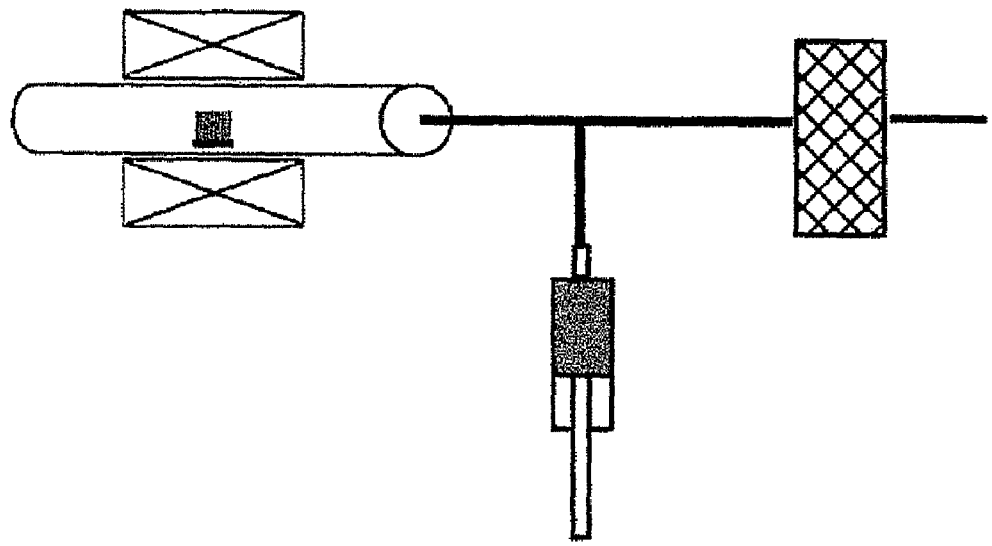
FIG. 15 is a schematic view of a production apparatus for a single-walled carbon nanotube or an aligned single-walled carbon nanotube bulk structure.
Figure 16:
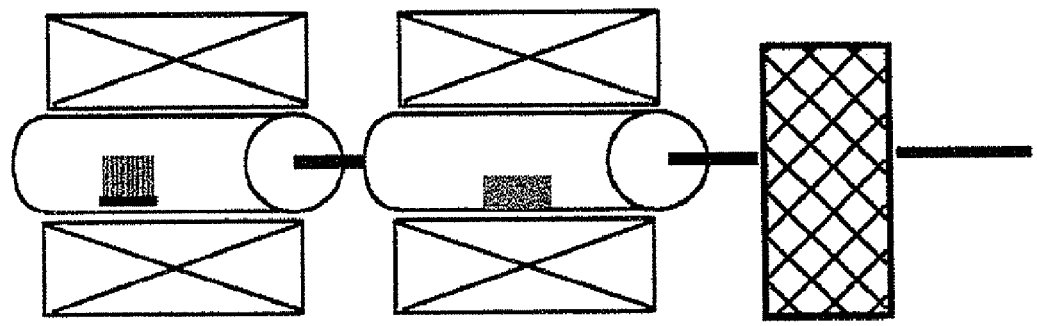
FIG. 16 is a schematic view of a production apparatus for a single-walled carbon nanotube or an aligned single-walled carbon nanotube bulk structure.

Further, in the method according to the present invention, the shape of the bulk structure can be controlled optionally depending on the patterning of the metal catalyst and the growth of the carbon nanotube. FIG. 11 shows an example for the way of controlling by modeling.

This is an example of a thin-film shape bulk structure (structure may be referred to as a bulk shape even when it is in a thin film shape relative to the diametrical size of the carbon nanotube) in which the thickness is thin compared with the width and, the width can be controlled to an optional length by the patterning of the catalyst, the thickness can also be controlled to an optional thickness by the patterning of the catalyst, and the height can be controlled by the growth of each of the vertically aligned single-walled carbon nanotubes constituting the structure. In FIG. 11, the orientation of the vertically aligned single-walled carbon nanotubes is shown by an arrow.

As a matter of course, the shape of aligned single-walled carbon nanotube-bulk structure produced by the method according to the present invention is not restricted to the thin-film shape and can be in various shapes by the patterning of the catalyst and the control for the growth such as columnar shape, prismatic shape, or a complicated shape.

While it is necessary that the chemical vapor deposition (CVD) apparatus for the carbon nanotube according to the present invention has means for supplying the oxidizing agent, other constitutions and structures of the reaction apparatus and the reaction furnaces for the CVD method have no particular restriction and any of known apparatus such as thermal CVD furnace, thermal heating furnace, electric furnace, drying furnace, thermostatic vessel, atmospheric furnace, gas substitution furnace, muffle furnace, oven, vacuum heating furnace, plasma reaction furnace, microplasma reaction furnace, RF plasma reaction furnace, electromagnetic heating reaction furnace, microwave irradiation reaction furnace, infrared ray irradiation heating furnace, UV-ray heating reaction furnace, MBE reaction furnace, MOCVD reaction furnace, and laser heating apparatus can be used.

Arrangement and constitution for the oxidizing agent supplying means have no particular restriction and they include supply as a gas or gas mixture, supply by evaporation of an oxidizing agent-containing solution, supply by evaporization and liquefication of a solid oxidizing agent, supply by using an oxidizing agent atmosphere gas, supply utilizing spray, supply utilizing high pressure or reduced pressure, supply utilizing injection, supply utilizing a gas stream, supply in combination of such means in plurality, etc., and it is adopted supply by using bubbler, gasifier, mixer, stirrer, dilution device, sprayer, nozzle, pump, injection syringe, or compressor, or a system comprising a plurality of such equipments in combination.

Further, for supplying an extremely very small amount of the oxidizing agent under precise control, the apparatus may be provided with a purification device for removing the oxidizing agent from the starting material gas or carrier gas and, in this case, the apparatus supplies the oxidizing agent in the amount controlled by any of the means described above to the starting gas or the carrier gas removed with the oxidizing agent in the subsequent stage. The method is effective in a case where the oxidizing effect is contained by a very small amount in the starting gas or the carrier gas.

Further, for stably supplying the oxidizing agent under precise control, the apparatus may be provided with a measuring device for measuring the concentration of the oxidizing agent and, in this case, a stable supply of the oxidizing agent with less change with time may be carried out by feeding back the measured value to the oxidizing agent flow control means.

Further, the measuring apparatus may be an apparatus for measuring the synthesis amount of the carbon nanotubes or, alternatively, it may be an apparatus for measuring by-products formed from the oxidizing agent.

Further, for synthesizing a great amount of carbon nanotubes, the reaction furnace may be provided with a system of supplying and recovering substrates in plurality or continuously.

FIG. 12 to FIG. 16 schematically show examples of the CVD apparatus used preferably for practicing the method according to the present invention.

Then, the method of producing carbon nanotubes according to (72nd) to (73rd) inventions of the application will be described.

The method according to the present invention has a feature in combining a step of growth carbon nanotubes and a step of breaking by-products that deactivate the catalyst, for example, amorphous carbon or graphite layers and conducting reaction under a gas phase or under a liquid phase.

The growth step means a step of growth crystals of a carbon nanotube. For the growth step, an existent carbon nanotube production steps is applied as it is. That is, as an embodiment of the growth step, any of existent carbon nanotube production steps can be used and, for example, it includes an embodiment of the growth carbon nanotubes by decomposing the starting carbon source on the catalyst in the chemical vapor deposition (CVD) apparatus.

The breaking step means a process of properly excluding by-products in the carbon nanotube production step which deactivate the catalyst, for example, amorphous carbon or graphite layer and not excluding the carbon nanotubes per se.

Accordingly, for the breaking step, any process can be adopted so long as it excludes by-products in the carbon nanotube production step, i.e., substances that deactivate the catalyst. Such step can include, for example, oxidation and combustion by the oxidizing agent, chemical etching, plasmas, ion milling, microwave irradiation, UV-ray irradiation, and breaking by quenching. Use of the oxidizing agent is preferred and, use of the water is particularly preferred.

The embodiment as a combination of the growth step and the breaking step includes, for example, simultaneous conduction of the growth step and the breaking step, alternate conduction of the growth step and the breaking step, or combination of a mode for emphasizing the growth step and a mode of emphasizing the breaking step, etc.

As apparatus for practicing the method according to the present invention, any of the apparatus described above can be used.

By the combination of such steps, in the method according to the present invention, the single-walled carbon nanotube and the single-walled aligned carbon nanotube can be produced at a high efficiency without deactivating the catalyst for a long time and, further, since various kinds of versatile processes such as chemical etching, plasmas, ion milling, microwave irradiation, UV-ray irradiation, and breaking by quenching can be adopted in addition to the oxidation and combustion by the oxidizing agent can be adopted and, any of the gas phase or the liquid phase process can be adopted, it provides a great advantage of increasing the degree of freedom for selecting the production process.

Since the single-walled carbon nanotube, the aligned single-walled carbon nanotubes comprising plural single-walled carbon nanotubes with the height of 10 μm or more, and the aligned single-walled carbon nanotube bulk structure comprising plural single-walled carbon nanotubes and whose shape is patterned to a predetermined shape according to the present invention have various properties and characteristics such as super high purity, super heat conductivity, high specific surface area, excellent electronic/electric properties, optical properties, super mechanical strength, and super high density, they can be applied to various technical fields and application uses. Particularly, the large-scaled vertically aligned bulk structure and the patterned vertically aligned bulk structure can be applied to the technical fields as described below.

(A) Heat Dissipation Material (Heat Dissipation Property)

Further higher rate and higher integration degree are demanded for the operation performance of CPU as a heart of a computer of an article requiring heat dissipation, for example, electronic parts and the degree of heat generation from CPU per se has been increased more and more, and it is said that a limit will be imposed on the improvement for the performance of LSI in near future. Heretofore, in a case of heat dissipating for such heat generation density, carbon nanotubes aligned at random buried in a polymer has been known as a heat dissipation material but it involves a problem of lacking in heat releasing property in the vertical direction. Since the large-scaled vertically aligned carbon nanotube bulk structure according to the present invention shows a high heat releasing property and is vertically aligned at a high density in an elongate form, the heat dissipating property in the vertical direction can be enhanced outstandingly by utilizing it as the heat dissipating material, compared with the existent goods.

Figure 17:
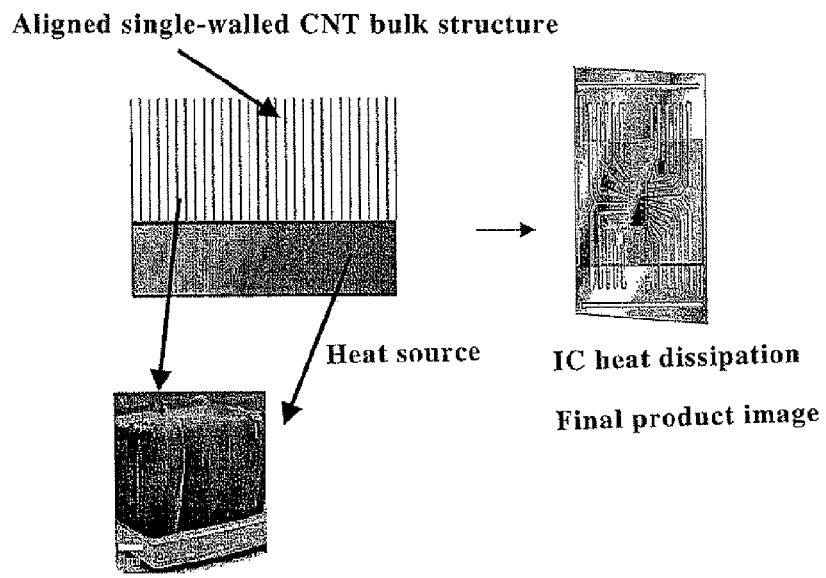
FIG. 17 is a schematic view of a heat dissipation material using an aligned single-walled carbon nanotube bulk structure and an electronic part provided with the heat dissipation material.

An example of the heat dissipating material is schematically shown in FIG. 17.

The heat dissipating material according to the present invention can be utilized not being restricted to electronic parts but to other various articles requiring heat dissipation, for example, as the heat dissipation material for electric products, optical products, and mechanical products.

(B) Heat Conductor (Heat Conduction Property)

Figure 18:
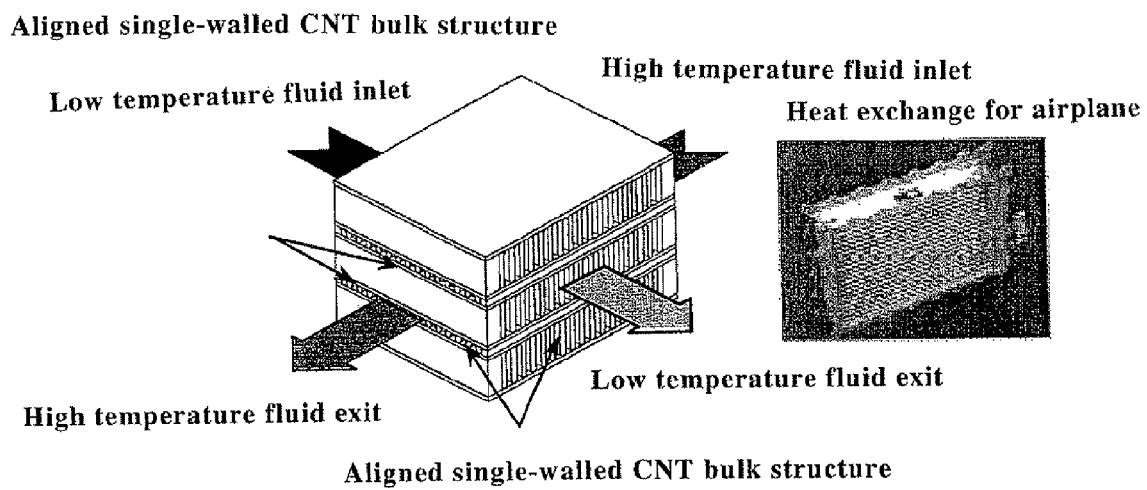
FIG. 18 is a schematic view of a heat exchanger using a heat conductor using an aligned single-walled carbon nanotube bulk structure.

The vertically aligned carbon nanotube bulk structure according to the present invention has a good heat conduction property. The vertically aligned carbon nanotube bulk structure excellent in heat conduction property can provide a high heat conduction material by being formed as a heat conduction material as a composite material containing the same and, in a case of application to a heat exchanger, drier, heat pipe, etc., can improve the performance thereof. In a case of applying such a heat conduction material to heat exchanger for aerospace use, the heat exchanging performance can be improved and the weight and volume can be reduced. Further, in a case of applying such a heat conduction material to fuel cell cogeneration or micro gas turbine, it is possible to improve the heat exchanger performance and improve the heat resistance. FIG. 18 schematically shows an example of a heat exchanger utilizing the heat conduction material.

(C) Electric Conductor (Electric Conductivity)

Figure 19:
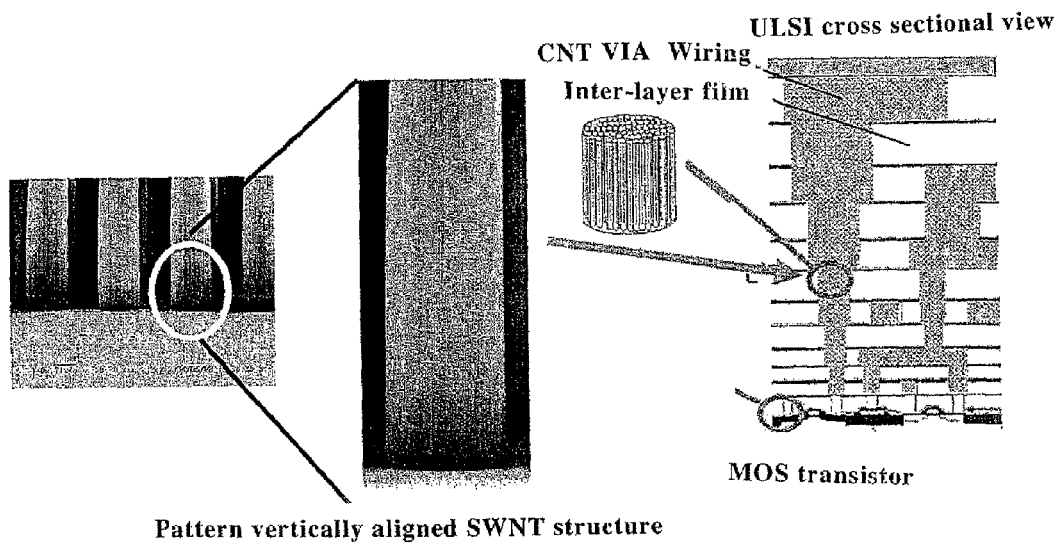
FIG. 19 is a schematic view of an electronic part provided with via wirings using an aligned single-walled carbon nanotube bulk structure.

An electronic part, for example, a current integrated LSI has a layered structure. A via wiring means a vertical wiring between vertical layers inside LSI for which copper wirings, etc. are used at present. However, along with refinement disconnection in the via has resulted in a problem such as by an electro-migration phenomenon. Instead of the copper wirings, in a case where vertical wirings are replaced with the vertically aligned single-walled carbon nanotube bulk structure according to the invention, or the aligned single-walled carbon nanotube bulk structure patterned for the shape of the structure into a predetermined shape, it is possible to supply a current at a 1,000 times density compared with copper and, since there is no electro-migration phenomenon, the via wirings can be further refined and stabilized. FIG. 19 schematically shows an example.

Further, the electric conductor according to the present invention or wirings formed therewith can be utilized as electric conductors or wirings for various articles, electric products, electronic products, optical products, and mechanical products.

For example, the vertically aligned single-walled carbon nanotube bulk structure or the aligned single-walled carbon nanotube bulk structure in which the shape of the structure is patterned into a predetermined shape according to the present invention can provide refinement and stabilization by using them instead of lateral copper wirings in the layer due to the superiority in view of high electroconductivity and mechanical strength.

(D) Optical Element (Optical Property)

Figure 20:
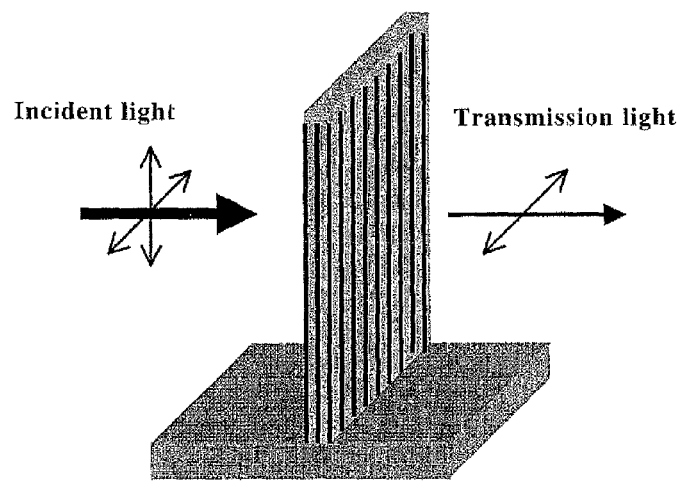
FIG. 20 is a schematic view of a polarizer using an aligned single-walled carbon nanotube bulk structure.

While calcite crystals have been used so far for optical elements, for example, a polarizer, since this is extremely large and expensive optical part and does not function effectively in an ultra short wavelength region which is important in the next generation lithography, a single-walled carbon nanotube as a single element has been proposed as a substitution material. However, this involves a problem of difficulty in highly aligning the elemental single-walled carbon nanotube and preparing a micro-aligned film structure having light transmittance. Since the vertically aligned single-walled carbon nanotube bulk structure or the aligned single-walled carbon nanotube bulk structure in which the shape of the structure is patterned in the a predetermined shape according to the present invention shows a super alignment property, the thickness of the aligned thin film can be controlled by changing the pattern of a catalyst and the light transmittance of the thin film can be controlled strictly, this shows an excellent polarization property in a wide wavelength range from the ultra short wavelength region to the infrared region when used as the polarizer. Further, since the ultra thin carbon nanotube aligned film functions as an optical element, the size of the polarizer can be miniaturized and FIG. 20 schematically shows an example of the polarizer.

The optical device according to the present invention is not restricted to the polarizer but can be applied as other optical devices by utilizing the optical property thereof.

(E) Strength Reinforcing Material (Mechanical Property)

Figure 21:
FIG. 21 is a view showing electron microscopic (SEM) photographic images showing a production process for a reinforced single-walled carbon nanotube fiber using an aligned single-walled carbon nanotube bulk structure, and a produced reinforced single-walled carbon nanotube fiber.
Figure 21:
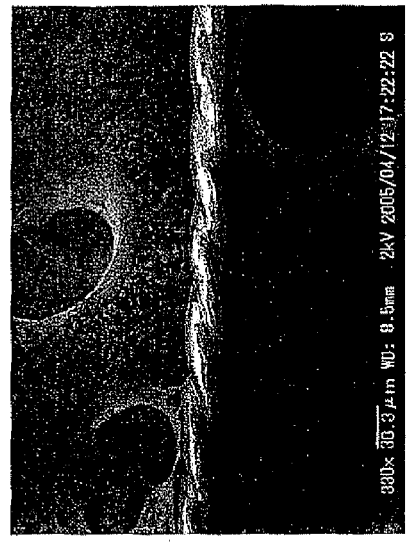
Figure 21:
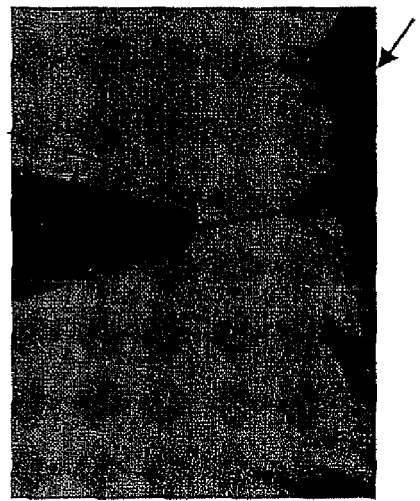
Figure 21:
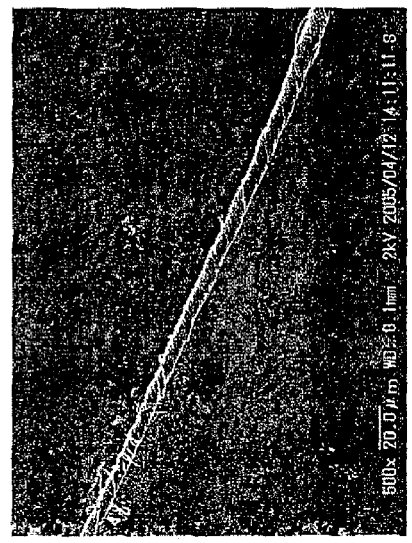

Heretofore, carbon fiber reinforced materials have a strength 50 times as large as aluminum and have been used generally as a material light in weight and having strength for example, in airplane parts and sports goods but further reduction in the weight and increase in the strength have been demanded strongly. Since the aligned single-walled carbon nanotube bulk structure or the aligned single-walled carbon nanotube bulk structure in which the shape is patterned into the predetermined shape according to the present invention has a strength several tens times as much as the existent carbon fiber reinforcing materials, products of extremely high strength can be obtained by utilizing the bulk structures instead of the existent carbon fiber reinforcing materials. Since the reinforcing materials have reduced in weight and high strength, as well as have characteristics such that they have high resistance to thermal oxidation (up to 3,000° C.), flexibility, electric conductivity, and electric wave shielding property, are excellent in chemical resistance and corrosion resistance, favorable in wear/creep property, excellent in wear resistance and vibration damping property, they can be utilized in the fields requiring reduced weight and strength including airplanes, sports goods, and automobiles. FIG. 21 is a view showing electron microscopic (SEM) photographic images of the process for producing reinforced single-walled carbon nanotube fibers using an aligned single-walled carbon nanotube bulk structure and a produced reinforced single-walled carbon nanotube fibers.

The reinforcing materials of the invention can be blended with base materials such as metals, ceramics, or resins into composite materials of high strength.

(F) Super Capacitor, Secondary Battery (Electric Property)

Since a super capacitor stores energy by migration of charges, it has a feature capable of flowing a large current, enduring charge/discharge exceeding 100,000 cycles, and showing short charging time. An important performance as the super capacitor is that the static capacitance is large and the internal resistance is low. The static capacitance is determined by the size of pores (holes) and it has been known to be maximum at the order of 3 to 5 nanometer referred to as meso-pores, which agrees with the size of a single-walled carbon nanotube synthesized by water addition method. Further, in a case of using the aligned single-walled carbon nanotube bulk structure or the aligned single-walled carbon nanotube bulk structure in which the shape of the structure is patterned into a predetermined shape according to the present invention, since all the constituent elements can be optimized in parallel and the surface area of the electrode, etc. can be maximized, the internal resistance can be minimized, so that a super capacitor of high performance can be obtained.

Figure 22:
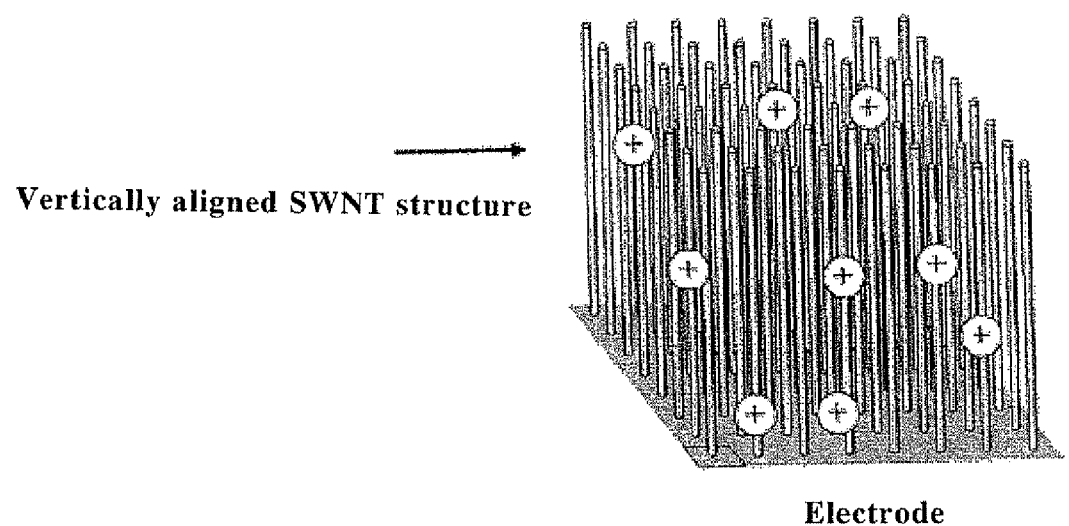
FIG. 22 is a schematic view of a super capacitor using an aligned single-walled carbon nanotube bulk structure as a constituent material and an electrode material.

FIG. 22 schematically shows an example of a super capacitor using, as a constituent material or an electrode material, the vertically aligned single-walled carbon nanotube bulk structure, or the aligned single-walled carbon nanotube bulk structure in which the shape of the structure is patterned into a predetermined shape according to the present invention.

The aligned single-walled carbon nanotube bulk structure according to the present invention can be applied not only to the super capacitor, but also to the constituent material for usual super capacitors, as well as electrode material for secondary batteries such as a lithium cell, electrode (negative electrode) material for fuel cell or air cell.

(G) Gas Storage Material/Absorbent (Absorbancy)

Figure 23:
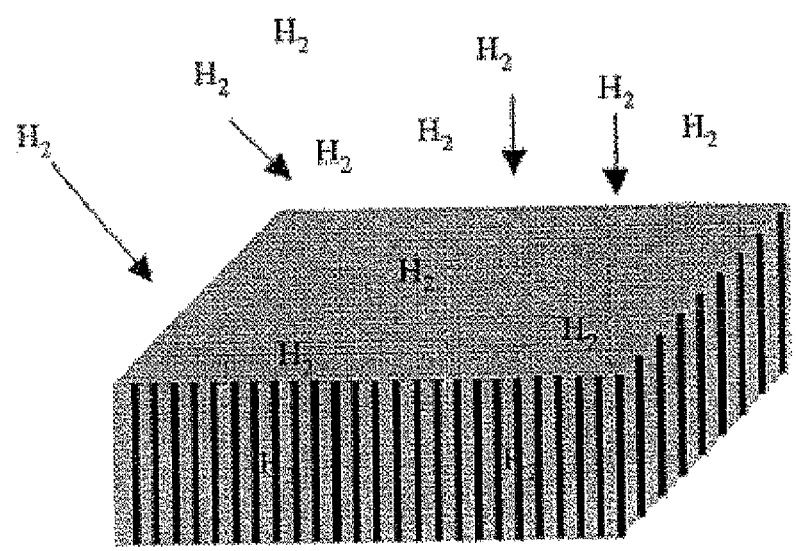
FIG. 23 is a schematic view of a hydrogen storage using an aligned single-walled carbon nanotube bulk structure.

It has been known that the carbon nanotube shows gas absorbancy to hydrogen or methane. Then, it can be expected for the aligned single-walled carbon nanotube according to the present invention having particularly large specific surface area to be applied to storage and transportation of a gas such as hydrogen or methane. FIG. 23 schematically shows a conceptional view in a case of applying the aligned single-walled carbon nanotube bulk structure according to the present invention as a hydrogen storage storage material. Further, it can absorb a noxious gas or substance and separation and purify the gas or the substance like an activated carbon filter.

EXAMPLE

Hereinafter, it will be described the present invention in more detail by way of examples. As a matter of course, the present invention is not restricted to the following examples.

Example 1

A carbon nanotube was grown by CVD method under the following conditions.
Carbon compound: ethylene; feed rate at 50 sccm
Atmosphere (gas)(Pa): helium, hydrogen gas mixture; feed rate at 1,000 sccm
Pressure: 1 atm
water vapor addition amount (ppm): 300 ppm
Reaction temperature (° C.): 750° C.
Reaction time (min): 10 min
Metal catalyst (existent amount): iron thin film; 1 nm thickness
Substrate: silicon wafer The catalyst was disposed on a substrate by using a sputtering vapor deposition apparatus and vapor depositing an iron metal to a thickness of 1 nm.

Figure 24:
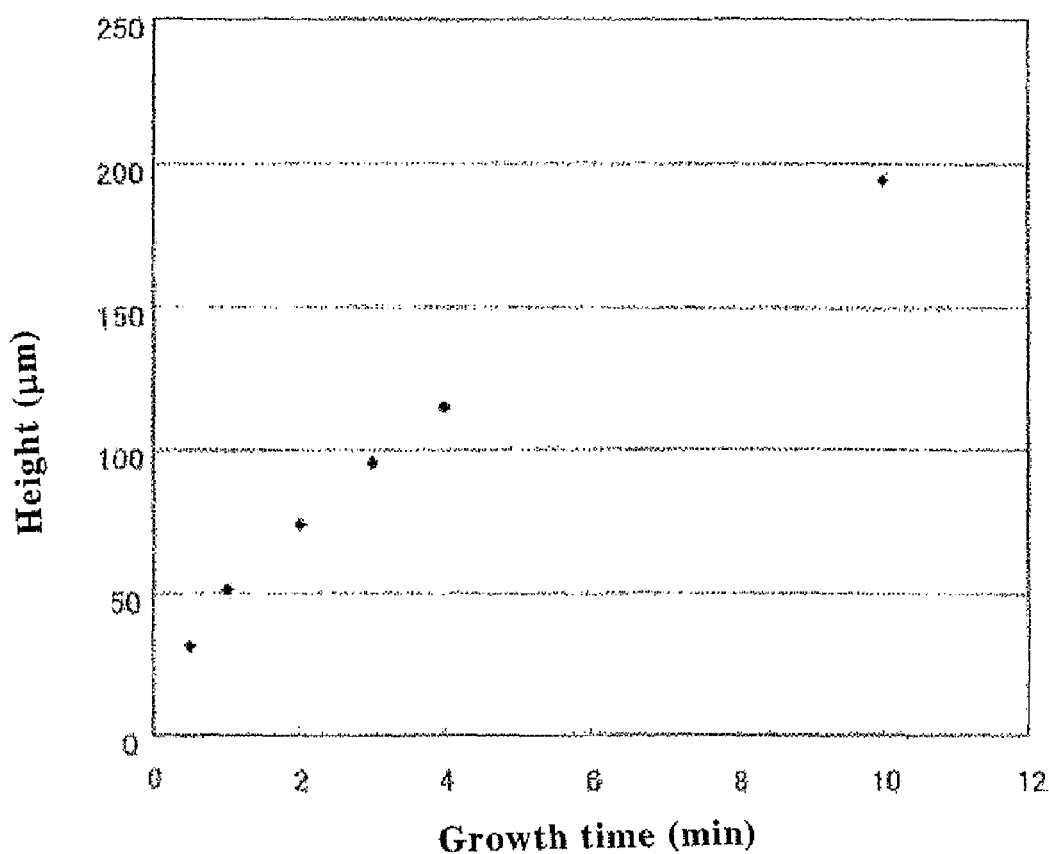
FIG. 24 is a graph showing the state of the growth of a vertically aligned single-walled carbon nanotube of Example 1.

A relation between the reaction time and the growth state of the vertically aligned single-walled carbon nanotube (height), under the conditions described above was examined. The result is shown in FIG. 24.

Further, for the comparison, the growth state of the vertically aligned single-walled carbon nanotube was examined (existent CVD method) in the same manner as described above except for not adding water vapor (existent CVD method). Results after 2 min and after 15 min are shown in FIG. 25.

Figure 25:
FIG. 25 is a view of photographic images showing the state of the growth of a single-walled carbon nanotube produced by an existent CVD process.
Figure 25:
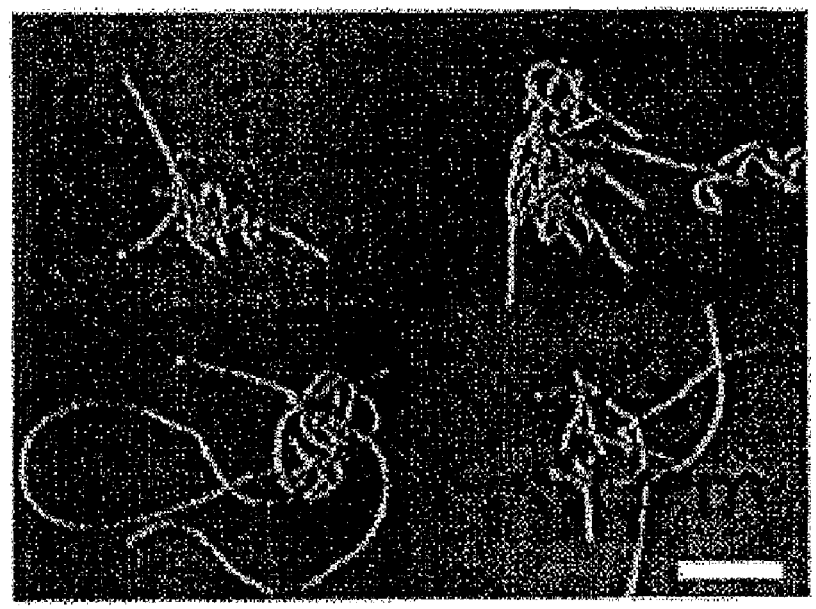

As a result, the catalyst was deactivated in several seconds in a case of growing vertically aligned single-walled carbon nanotube by the existent CVD method and the growth was stopped 2 min after, whereas in the method of Example 1 with addition of water vapor, the growth continued for a long time as shown in FIG. 25, and continuation of the growth was observed actually for about 30 min. Further, it was found that the growth rate of the vertically aligned single-walled carbon nanotube according to the method of Example 1 was extremely higher as about 100 times of the existent method. Further, intrusion of the catalyst or amorphous carbon was not recognized in the vertically aligned single-walled carbon nanotube according to the method of Example 1, and the purity thereof was 99.98 mass % in a not-purified state. On the other hand, for the vertically aligned carbon nanotube obtained by the existent method, an amount that could be measured for the purity could not be obtained. Based on the result, superiority due to the addition of water vapor was confirmed regarding the growth of the vertically aligned single-walled carbon nanotube in the CVD method was confirmed.

Example 2

A carbon nanotube was grown by CVD method under the following conditions.
Carbon compound: ethylene; feed rate at 100 seem
Atmosphere (gas): helium, hydrogen gas mixture; feed rate at 1,000 sccm
Pressure: 1 atm
Water vapor addition amount (ppm): 175 ppm
Reaction temperature (° C.): 750° C.
Reaction time (min): 10 min
Metal catalyst (existent amount): iron thin film; 1 nm thickness
Substrate: silicon wafer The catalyst was disposed on a substrate by using a sputtering vapor deposition apparatus and vapor depositing an iron metal to a thickness of 1 nm.

Figure 26:
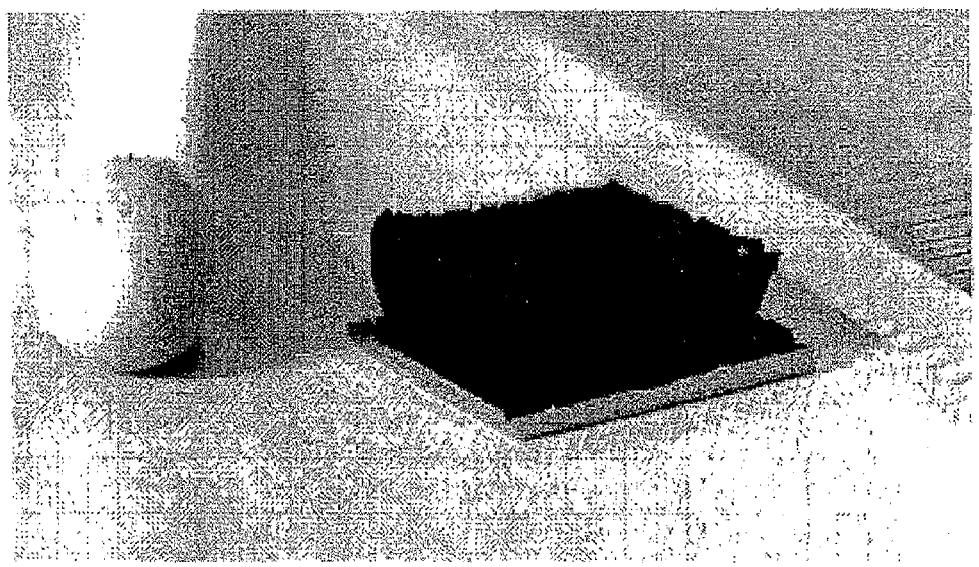
FIG. 26 shows images formed by printing the photograph taken by a digital camera of a vertically aligned single-walled carbon nanotube bulk structure produced in Example 2.

FIG. 26 shoes images formed by printing photographs, taken-up by a digital camera, of vertically aligned single-walled carbon nanotubes grown under the conditions described above. FIG. 26 shows the vertically aligned single-walled carbon nanotubes grown to a height of about 2.5 mm at the center, a match stick on the left, and a ruler with one gradation for 1 mm on the right.

Figure 27:
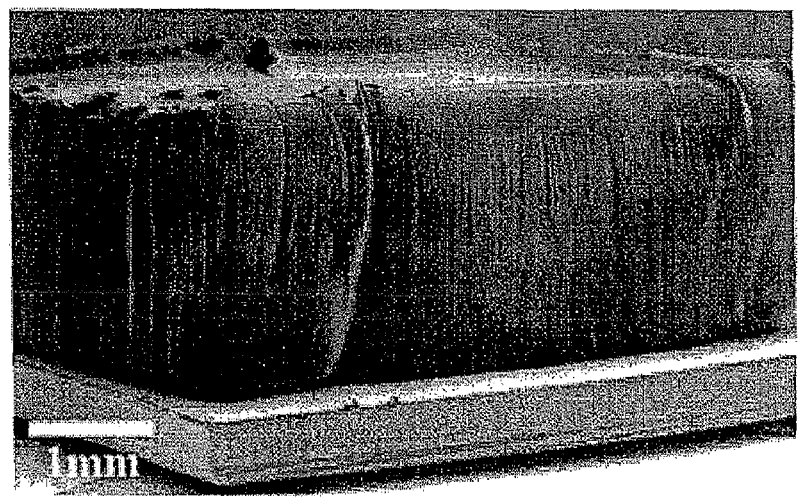
FIG. 27 is a view showing electron microscopic (SEM) photographic images of a vertically aligned single-walled carbon nanotube bulk structure produced in Example 2.

FIG. 27 is a perspective view showing electron microscopic (SEM) photographic images for vertically aligned single-walled carbon nanotubes grown in Example 2.

Figure 28:
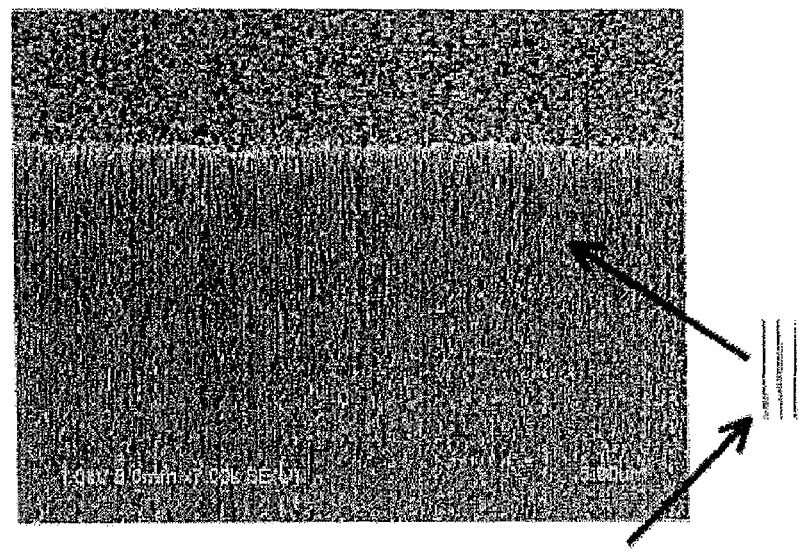
FIG. 28 is a view showing enlarged electron microscopic (SEM) photographic images of a vertically aligned of single-walled carbon nanotube bulk structure produced in Example 2.

FIG. 28 shows enlarged electron microscopic (SEM) photographic images for vertically aligned single-walled carbon nanotubes grown in FIG. 2. From FIG. 28, it can be seen the state where the vertically aligned single-walled carbon nanotubes at a height of 2.5 mm are aligned vertically at a super high density.

Figure 29:
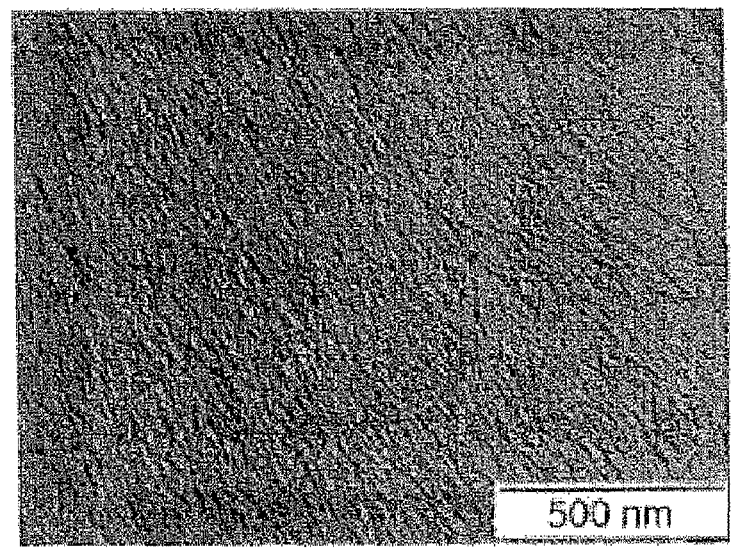
FIG. 29 is a view showing photographic images of a vertically aligned single-walled carbon nanotube bulk structure produced in Example 2, separated from a substrate, dispersed in an aqueous solution, and observed by an electron microscope (TEM).
Figure 30:
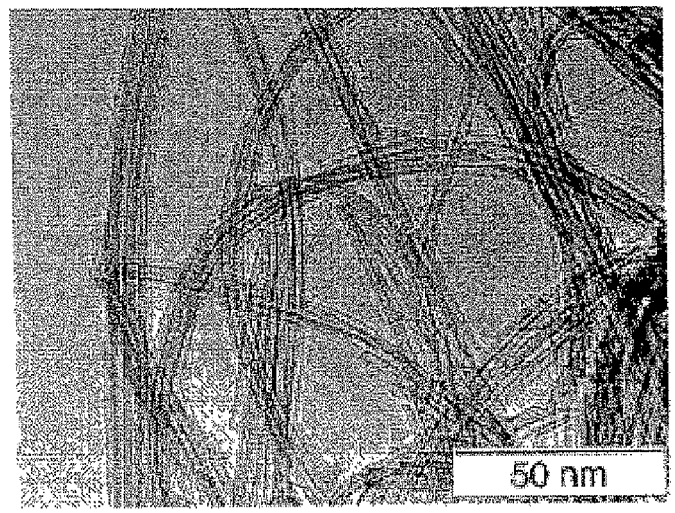
FIG. 30 is a view showing enlarged photographic images of a vertically aligned single-walled carbon nanotube bulk structure produced in Example 2, separated from a substrate, dispersed in an aqueous solution, and observed by an electron microscope (TEM).
Figure 31:
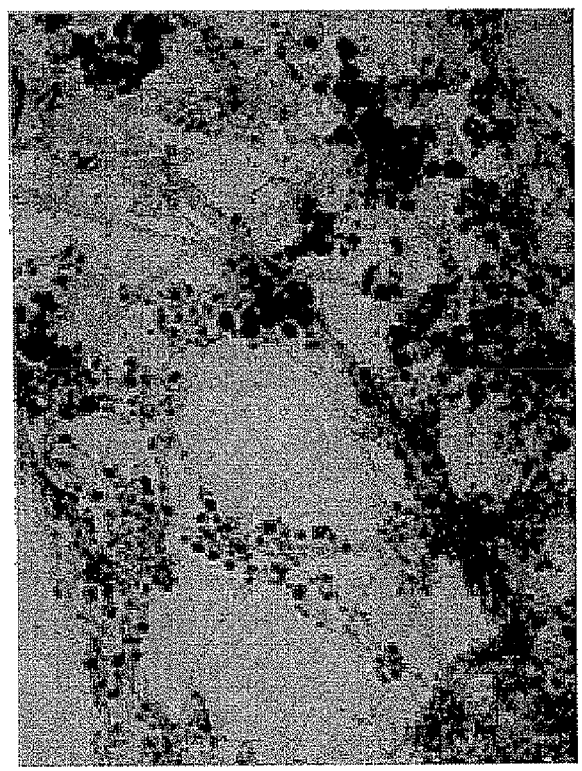
FIG. 31 is a view, like FIG. 30, of an as-grown single-walled carbon nanotube produced by the existent CVD method.

FIG. 29 and FIG. 30 show photographic images of the vertically aligned single-walled carbon nanotubes by peeling them from a substrate using tweezers, dispersing them in an ethanol solution and placing them on a grid of an electron microscope (TEM) and observing them by the electron microscope (TEM). It can be seen that the obtained carbon nanotubes are single-walled. Further, it can be seen that neither catalyst nor amorphous carbon is intruded at all in the grown substance. The single-walled carbon nanotubes in Example 2 were at 99.98 mass % in a not purified state. For comparison, FIG. 31 shows ideal electron microscopic (TEM) photographic images of as-grown single-walled carbon nanotubes prepared by an existent CVD method with no addition of water vapor. In FIG. 31, black spots show catalyst impurities.

Figure 32:
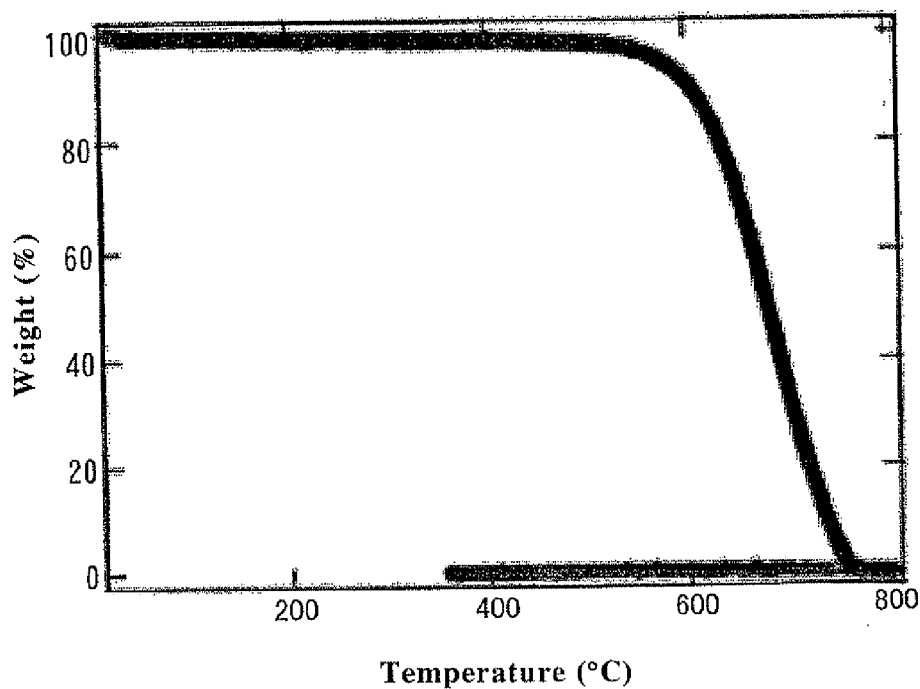
FIG. 32 is a graph showing the result of thermogravimetric analysis of a vertically aligned single-walled carbon nanotube bulk structure produced in Example 2.

FIG. 32 shows the result of thermogravimetric analysis for the vertically aligned single-walled carbon nanotubes produced in Example 2. TGD-900 manufactured by ULBAC Inc. was used as an analyzer. It can be seen from the portion shown at A in the graph that the reduction of weight at a low temperature is small and no amorphous carbon is present. It can be seen from the portion shown at B in the graph that the combustion temperature of the single-walled carbon nanotube is high and the quality is high (high purity). It can be seen that from the portion shown at C in the graph that residues are not contained.

Further, impurity measurement was carried out by fluorescence X-rays for the vertically aligned single-walled carbon nanotubes produced in Example 2. As a result, only the impurity element Fe as the catalyst was detected by 0.013 mass %, and other impurities were not detected. Further, iron impurities were mixed in the cellulose used for immobilization to an extent identical with that in the vertically aligned single-walled carbon nanotubes in Example 2 and it is estimated that the actual purity of the vertically aligned single-walled carbon nanotubes in Example 2 was further higher. Further, as comparison, when impurity measurement was carried out by identical fluorescence X-rays also for the vertically aligned single-walled carbon nanotubes produced by the existent CVD method and the vertically aligned single-walled carbon nanotubes produced by the HiPco method, the impurity element Fe was detected by 17 mass % for those by the existent CVD method and the impurity Fe was detected by 30 mass % for those by the HiPco method.

Example 3

A carbon nanotube was grown by CVD method under the following conditions.
  Carbon compound: ethylene; feed rate at 75 sccm
  Atmosphere (gas): helium, hydrogen gas mixture; feed rate at 1,000 sccm
  Pressure: 1 atm
  Water vapor addition amount (ppm): 400 ppm
  Reaction temperature (° C.): 750° C.
  Reaction time (min): 10 min
  Metal catalyst (existent amount): iron thin film; 1 nm thickness
  Substrate: silicon wafer The catalyst was disposed on a substrate by using a sputter vapor deposition apparatus and vapor depositing an iron metal to a thickness of 1 nm.

The peeling property of the vertically aligned single-walled carbon nanotubes produced as described above was examined. Peeling was conducted by using tweezers.

Figure 33:
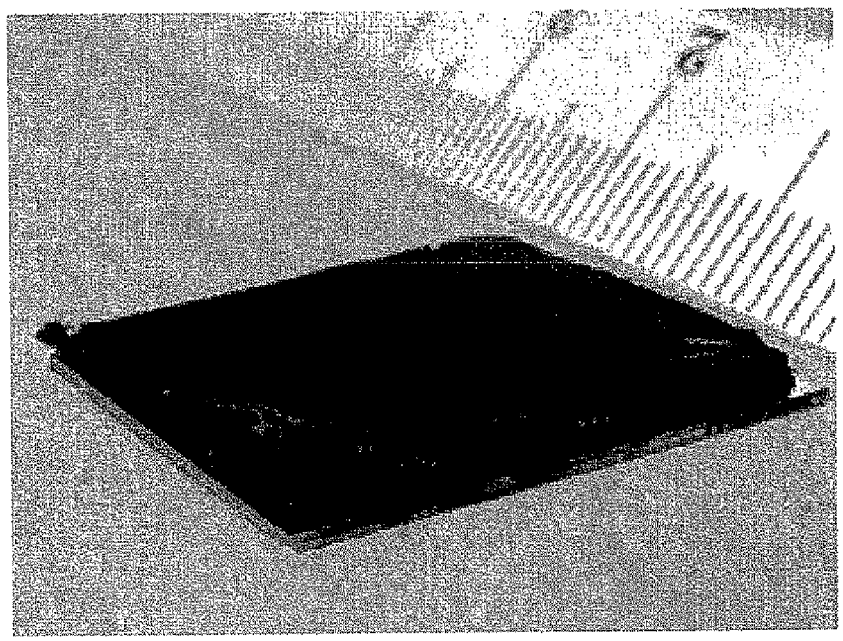
FIG. 33 is a view showing photographic images, taken by a digital camera, showing the state of the vertically aligned single-walled carbon nanotube bulk structure before peeling.
Figure 34:
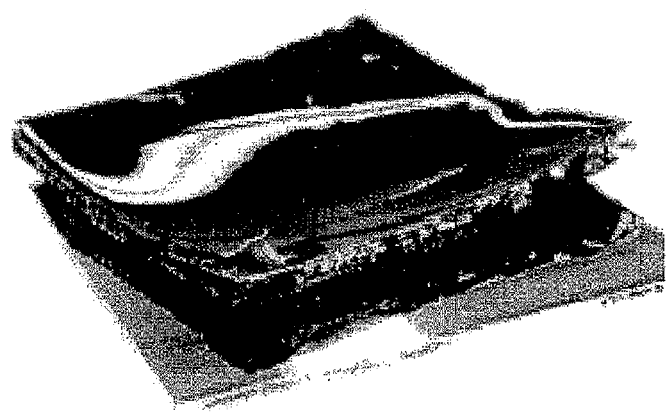
FIG. 34 is a view, like FIG. 33, after peeling.
Figure 35:
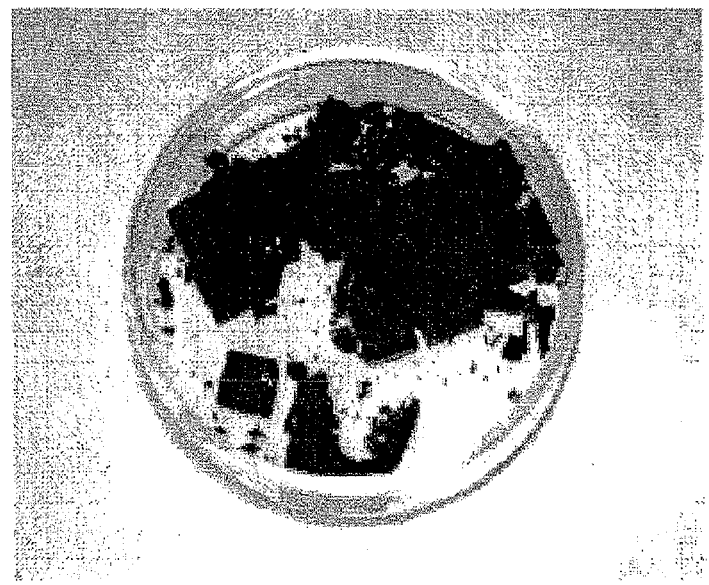
FIG. 35 is a view showing a peeled as-grown single-walled carbon nanotube products placed in a vessel.

FIG. 33 shows a state of vertically aligned single-walled carbon nanotubes before peeling taken-up by a digital camera, FIG. 34 shows a state after peeling and FIG. 35 shows as-grown single-walled carbon nanotube purification products (30 mg) peeled and placed in a vessel. As the result of the peeling test, it was confirmed that the vertically aligned single-walled carbon nanotubes produced by the method of the invention were peeled easily.

Example 4

A vertically aligned single-walled carbon nanotube bulk structure was grown by a CVD method under the following conditions.
  Carbon compound: ethylene; feed rate at 75 sccm
  Atmosphere (gas): helium, hydrogen gas mixture; feed rate at 1,000 sccm
  Pressure: 1 atm
  Water vapor addition amount (ppm): 400 ppm
  Reaction temperature (° C.): 750° C.
  Reaction time (min): 10 min
  Metal catalyst (existent amount): iron thin film; 1 nm thickness
  Substrate: silicon wafer The catalyst was disposed on a substrate as described below.

An electron beam exposure resist ZEP-520A was appended thinly on a silicon wafer by a spin coater at 4,700 rpm for 60 sec and baked at 200° C. for 3 min. Then, by using an electron beam exposure apparatus, a circular pattern of 150 μm diameter was formed at a 250 μm pitch on the resist-appended substrate. Then, by using a sputtering vapor deposition apparatus, iron metal was vapor deposited to 1 nm thickness and, finally, the resist was peeled by a peeling solution ZD-MAC from the substrate, to prepare a silicon wafer to which the catalyst metal was patterned optionally.

Figure 36:
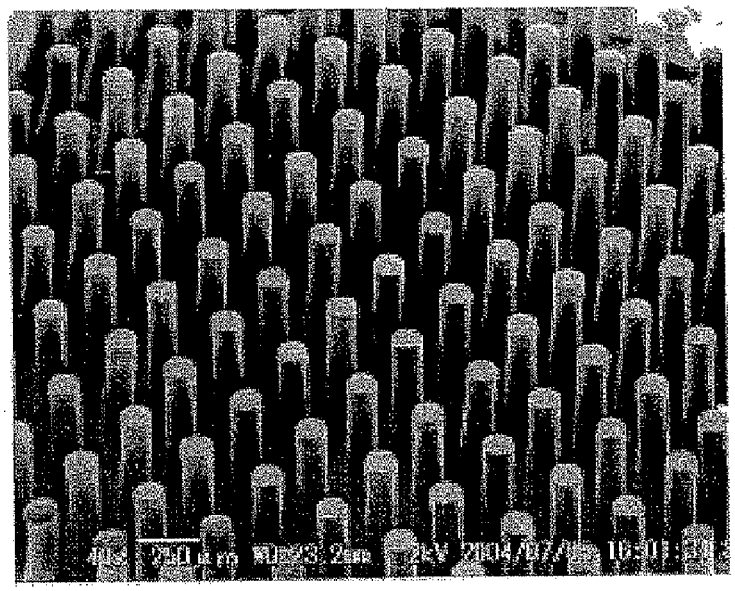
FIG. 36 is a view showing electron microscopic (SEM) photographic images for the shape of a vertical aligned single-walled carbon nanotube bulk structure patterned into circular columnar shape.
Figure 37:
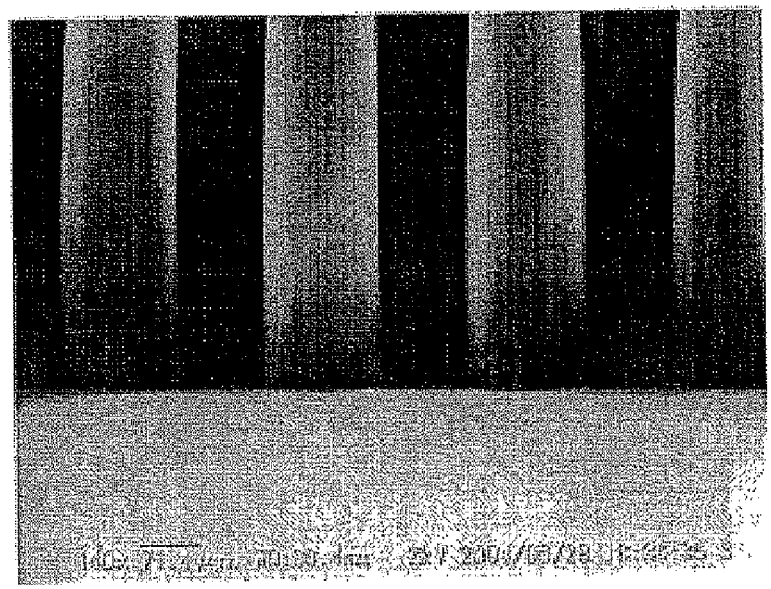
FIG. 37 is a view showing images taken, by an electron microscope (SEM), for the state of a base of a bulk structure in FIG. 36.
Figure 38:
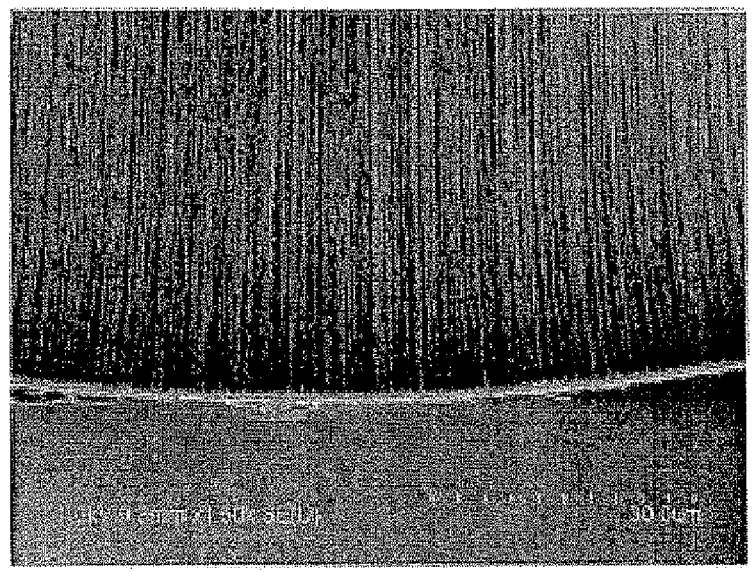
FIG. 38 is a view showing enlarged images taken, by an electron microscope (SEM), for the state of a base of a bulk structure in FIG. 36.

Under the conditions described above, an assembly of vertically aligned single-walled carbon nanotubes patterned into a circular cylindrical shape was obtained. FIG. 36 shows the shape of the assembly as images taken-up by an electron microscope (SEM) and FIG. 37 and FIG. 38 show images for the state of the base of the assembly taken-up by an electron microscope (SEM). It can be confirmed from FIG. 38 that the single-walled carbon nanotubes are aligned in plurality in the vertical direction at a super high density.

Example 5

An aligned single-walled carbon nanotube bulk structure was grown by a CVD method under the following conditions.
  Carbon compound: ethylene; feed rate at 75 sccm
  Atmosphere (gas): helium, hydrogen gas mixture; feed rate at 1,000 sccm
  Pressure: 1 atm
  Water vapor addition amount (ppm): 400 ppm
  Reaction temperature (° C.): 750° C.
  Reaction time (min): 10 min
  Metal catalyst (existent amount): iron thin film; 1 nm thickness
  Substrate: silicon wafer The catalyst was disposed on a substrate as described below.

An electron beam exposure resist ZEP-520A was appended thinly on a silicon wafer by a spin coater at 4,700 rpm for 60 sec and baked at 200° C. for 3 min. Then, by using an electron beam exposure apparatus to prepare a pattern of 3 to 1,005 μm thickness, 375 μm to 5 mm length, and 10 μm to 1 mm pitch. Then, by using a sputtering vapor deposition apparatus, iron metal was vapor deposited to 1 nm thickness and, finally, the resist was peeled by a peeling solution ZD-MAC from the substrate, to prepare a silicon wafer to which the catalyst metal was patterned optionally.

Figure 39:
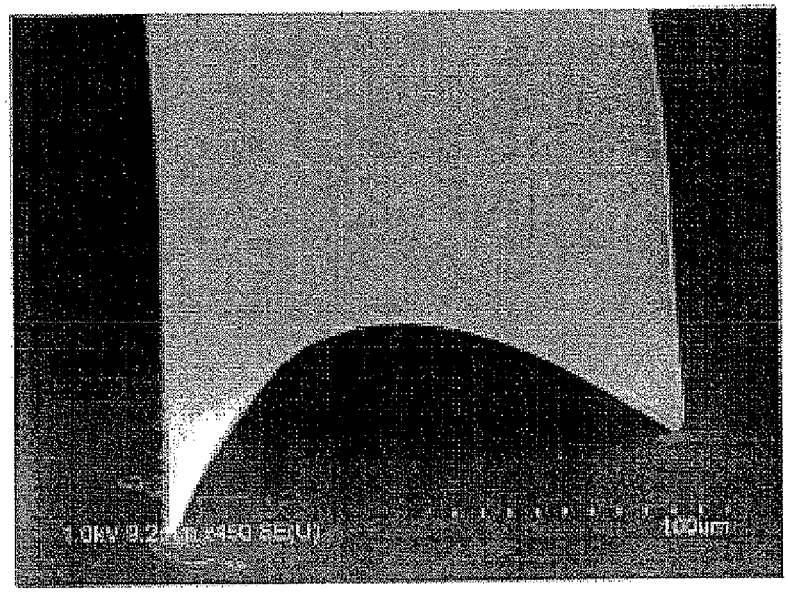
FIG. 39 is a view showing an example of an aligned single-walled carbon nanotube bulk structure by electron microscopic (SEM) photographic images.
Figure 40:
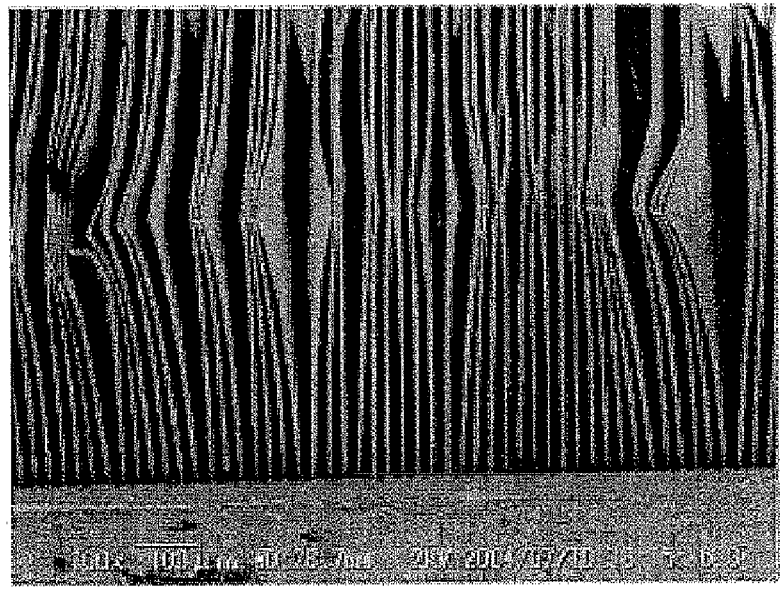
FIG. 40 is a view showing another example of an aligned single-walled carbon nanotube bulk structure by electron microscopic (SEM) photographic images.
Figure 41:
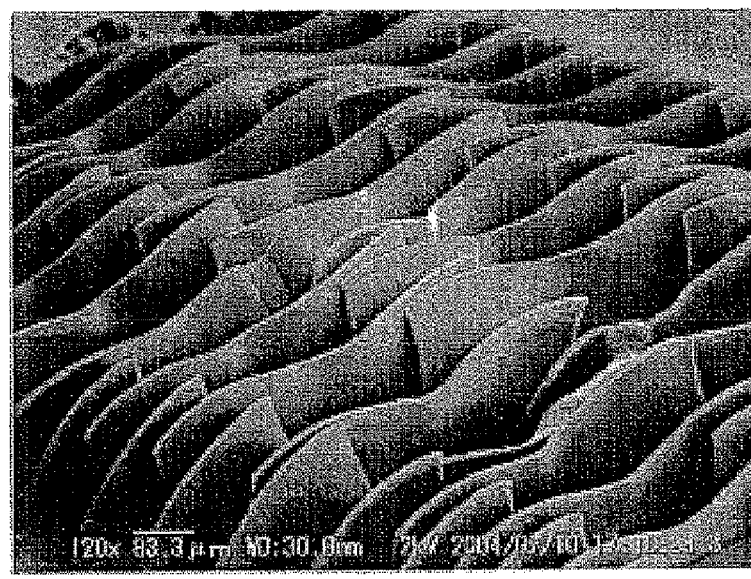
FIG. 41 is a view showing other example of an aligned single-walled carbon nanotube bulk structure by electron microscopic (SEM) photographic images.
Figure 42:
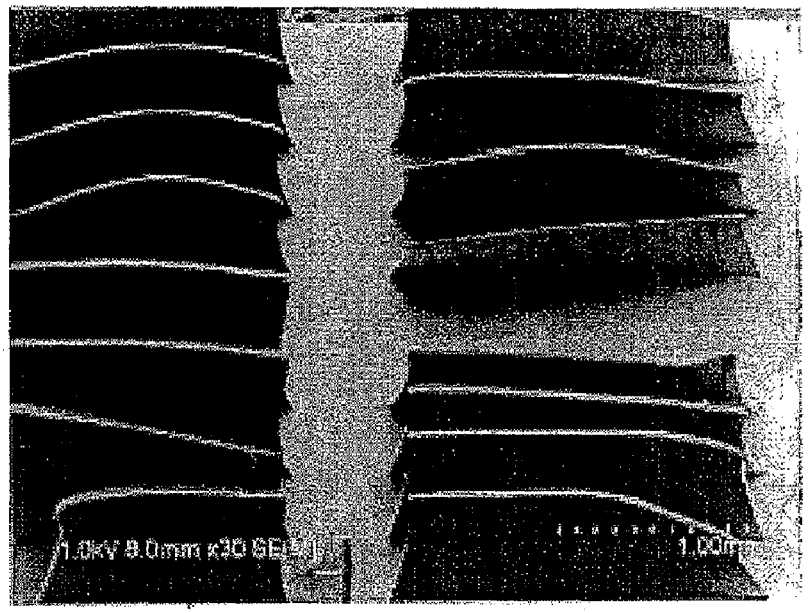
FIG. 42 is a view showing other example of an aligned single-walled carbon nanotube bulk structure by electron microscopic (SEM) photographic images.
Figure 43:
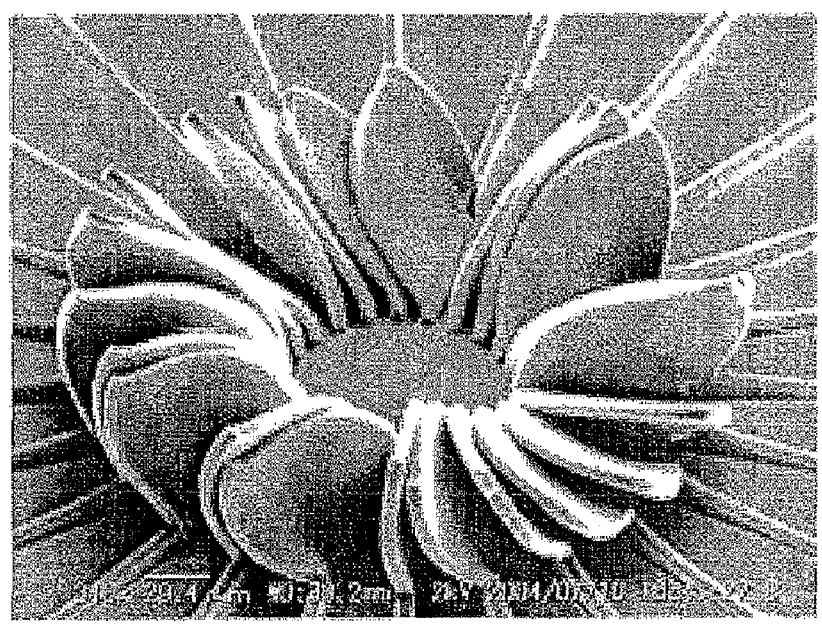
FIG. 43 is a view showing other example of an aligned single-walled carbon nanotube bulk structure by electron microscopic (SEM) photographic images.
Figure 44:
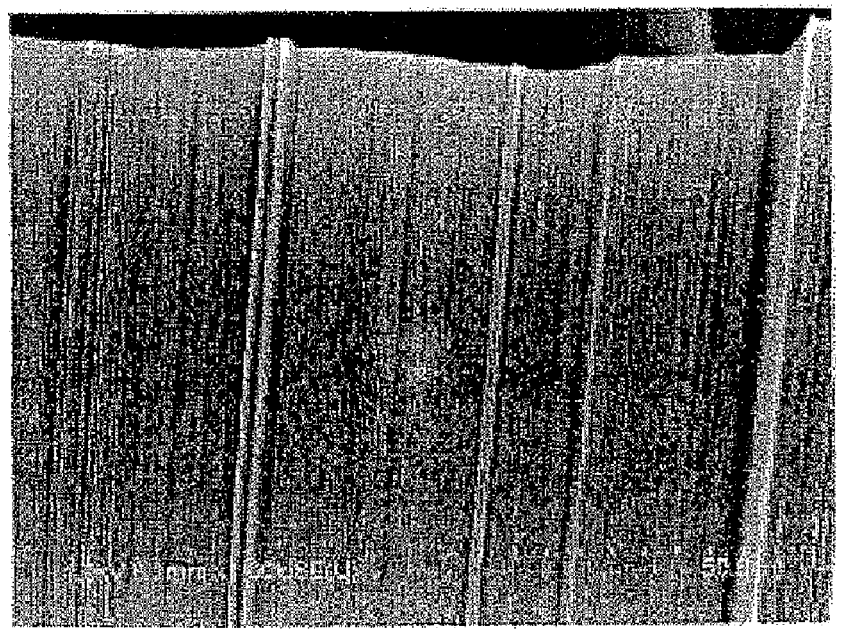
FIG. 44 is a view showing an images of an aligned bulk structure observed by an electron microscope (SEM) from the frontal surface.
Figure 45:
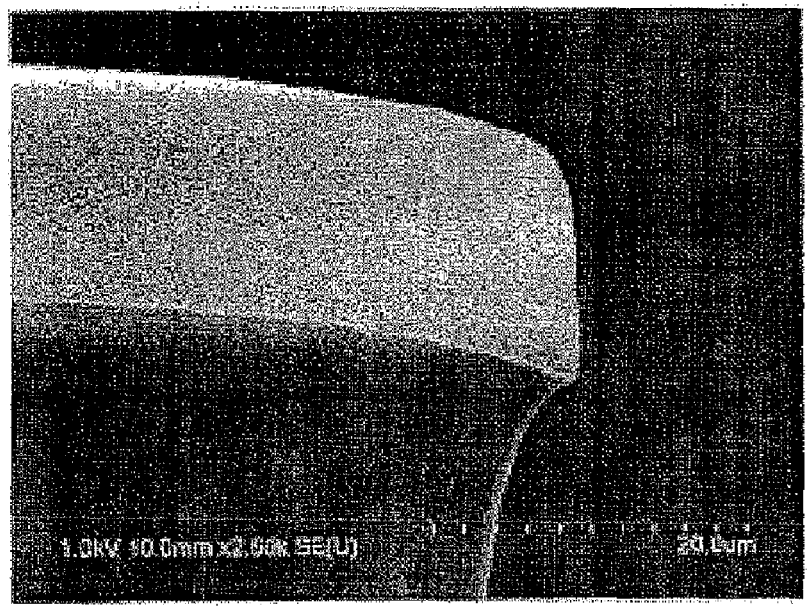
FIG. 45 is a view showing images for the corner of an example of an aligned bulk structure observed by electron microscope (SEM).

FIG. 39 to FIG. 43 show five examples of vertically aligned single-walled carbon nanotube bulk structure produced by changing the patterning of the catalyst and the reaction time by electron microscopic (SEM) photographic images. It can be seen that the structure in FIG. 39 is a thin film structure of 5 μm thickness and has flexibility. FIG. 40 is a view showing a plurality of thin film structures from the lateral side and it can also be seen that it has flexibility. FIG. 41 shows a plurality of thin film structures arranged in a complex state. FIG. 42 shows a thin film structure of different thickness with the current thickness of 3 μm at the minimum and those of larger thickness can optionally be controlled by the patterning of the catalyst. FIG. 43 shows a structure of a complicate shape. Further, FIG. 44 shows an example of the aligned structures as images observed from the frontal side by an electron microscope (SEM), and FIG. 45 shows images for the corner of one example of the aligned structures observed by an electron microscope (SEM). From each of them, it can be seen that the single-walled carbon nanotubes are aligned.

Example 7

Super Capacitor

Figure 46:
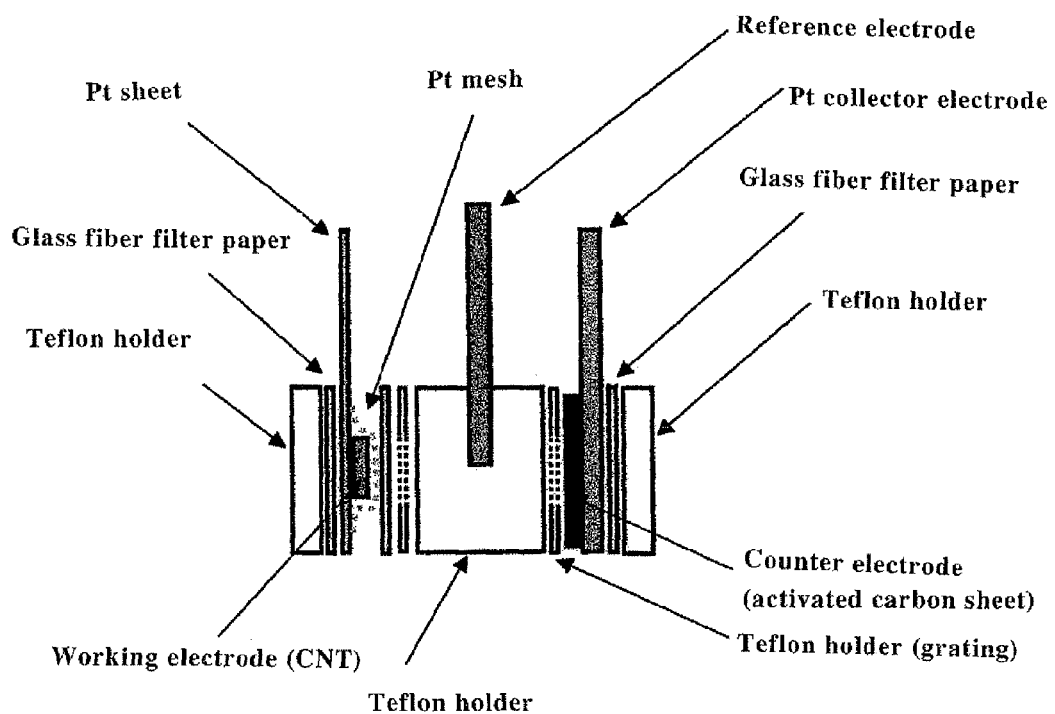
FIG. 46 is a view showing a schematic experimental cell of a super capacitor used in Example 6.

For the evaluation of the characteristics of the vertically aligned single-walled carbon nanotube bulk structure obtained in Example 2 as a capacitor electrode, 2.917 mg of an aligned single-walled carbon nanotube bulk structure was bonded with a conductive adhesive as an operation electrode on an Al plate as shown in FIG. 46 and an experimental cell was assembled. TEABF$_4$/PC at 1M concentration was used as an electrolyte. The constant current charge/discharge characteristic of the thus manufactured experimental cell was measured. FIG. 47 shows the result. It can be seen from charge/discharge curves of FIG. 47 that the aligned single-walled carbon nanotubes operated as a capacitor material, the internal resistance was low and the capacitance was substantially constant and not lowered even upon high rate charge/discharge (high current density).

Example 8

Lithium Ion Cell (Secondary Battery)

Figure 48:
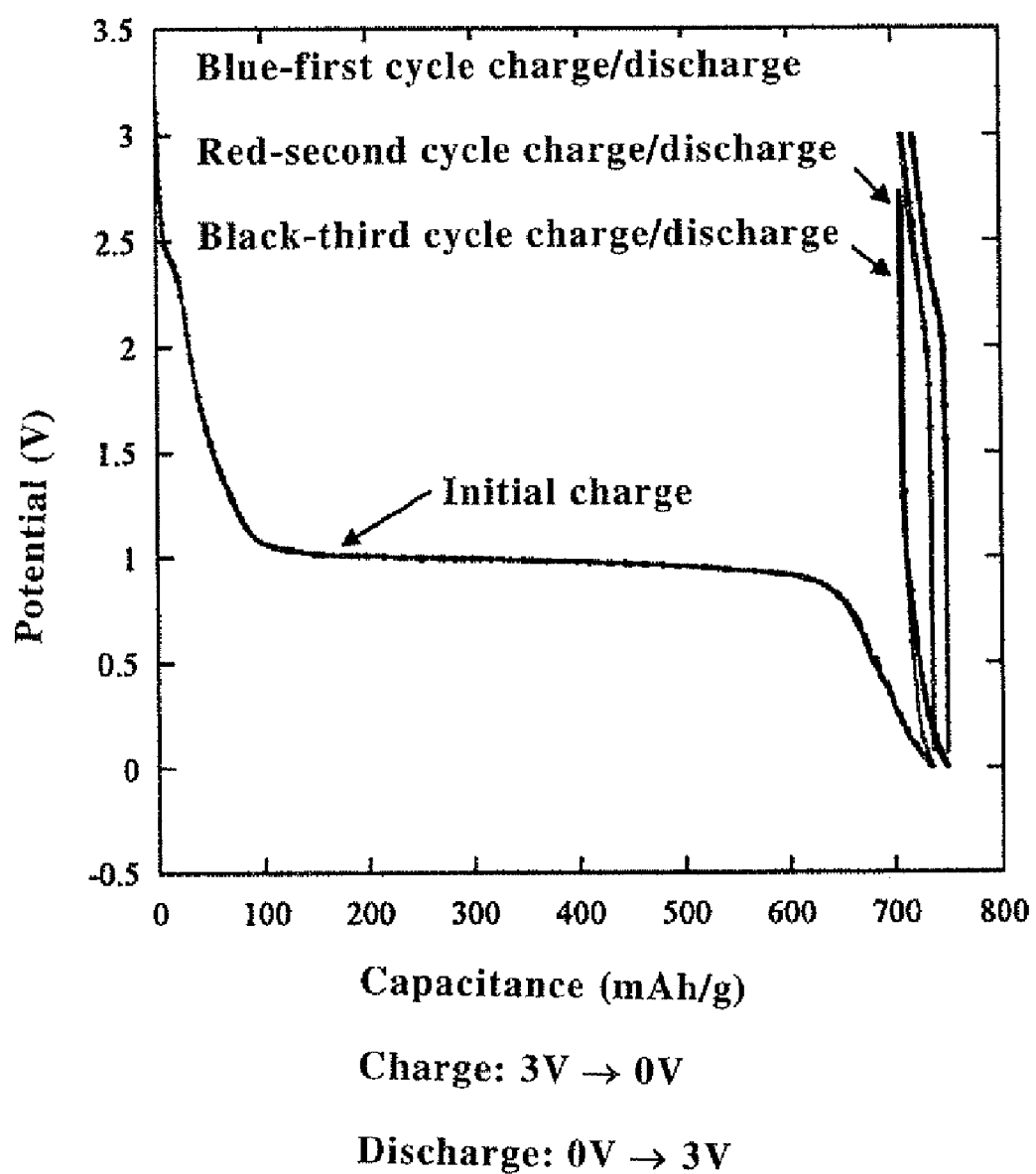
FIG. 48 is a graph of the charge/discharge characteristic of a lithium cell obtained in Example 7.

2.4 mg of the aligned single-walled carbon nanotube bulk structure obtained in Example 2 was used as the operation electrode. Lithium was used for the counter electrode and the reference electrode. Stainless was used for the collector and the battery was assembled by using the cell of commercial products manufactured by Hohsen Corp. LiBF$_4$/EC:DEC (1:1) at 1M was used as the electrolyte and charge/discharge characteristic was evaluated at a current density of 20 mA/g. FIG. 48 shows the result. From FIG. 48, extremely large irreversible charge/discharge was observed in the first cycle of discharge. Occurrence of large charge at an extremely stable potential suggests that intercalation of lithium occurs in the aligned single-walled carbon nanotube bulk structure. Stable charge/discharge characteristics were obtained at and after the second cycle and the operation as the battery was confirmed. It can be seen that the aligned single-walled carbon nanotube bulk structure can be used as the electrode material for the secondary battery.

Example 9

For 50 mg of the aligned single-walled carbon nanotube bulk structure obtained in Example 2, adsorption/desorption isothermal curves for liquid nitrogen were measured at 77 using BELSORP-MINI of Bel Japan Inc. (adsorption equilibrium temperature was 600 sec). The entire adsorption amount showed an extremely large numerical value (1,650 m$^2$/g). When the specific surface area was measured from the adsorption/desorption isothermal curves, it was 1,100 m$^2$/g.

Figure 49:
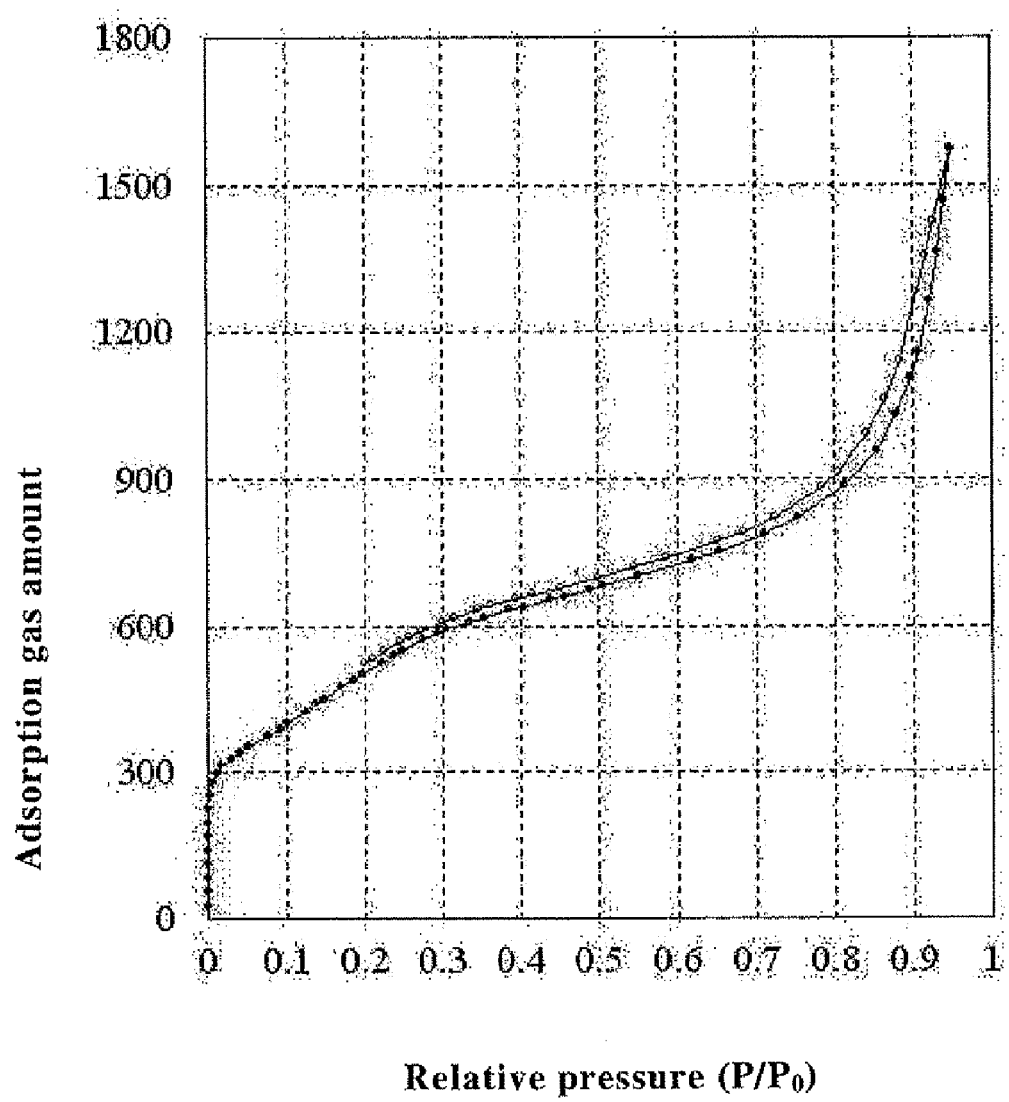
FIG. 49 is a graph showing absorption/desorption isothermal curves of an aligned single-walled carbon nanotube bulk structure measured in Example 8.

Further, 50 mg portion was torn from the identical aligned single-walled carbon nanotube bulk structure by tweezers, disposed evenly on an aluminum tray, and placed in a muffle furnace. Then, temperature was elevated up to 550° C. at 1° C./min and a heat treatment was conducted at 550° C. for one min in oxygen (20% concentration). The weight of the sample after the heat treatment was 43 mg and remaining 7 mg was burnt out. In the same manner as described above, the adsorption/desorption isothermal curves of liquid nitrogen were measured for the sample after the heat treatment (FIG. 49). As a result, when the specific surface area was estimated, it was about 2,000 m$^2$/g. The sample after the heat treatment had a large specific surface area compared with the as-grown sample and it was suggested that the top ends of the carbon nanotubes were opened by the heat treatment. In the graph, P represents an adsorption equilibrium pressure and P$_o$ represents a saturated vapor pressure. The as-grown not-opened single-walled carbon nanotubes (FIG. 6) show a high linearity for the adsorption/desorption isothermal curves of liquid nitrogen in a low relative pressure region of 0.5. On the other hand, the adsorption/desorption isothermal curves of the opened single-walled carbon nanotube (FIG. 49) are characterized by a large initial adsorption rising and by convex adsorption/desorption isothermal curves at a large adsorption amount in a relative pressure region of 0.5 or lower. The convex-adsorption/desorption isothermal curves are shown because adsorption occurs at the inner surface and the outer surface in the opened carbon nanotubes. As described above, by measuring the adsorption/desorption isothermal curves, it can be distinguished whether the carbon nanotubes are not opened or opened.

Example 10

Polarizer

The polarization dependency of light transmittance was measured by using the aligned single-walled carbon nanotube bulk structure obtained in Example 4. A sample of 300 nm thickness was used and measurement was carried out by using a helium/neon laser as a light source and using a λ/2 Fresnel rhomb wavelength plate, an objective lens, and a light power meter. A laser light at 633 nm emitted from the light source was controlled for the intensity by using an ND filter and then condensed by using an optical lens to the surface of the aligned single-walled carbon nanotube bulk structure sample. The laser light transmits the aligned single-walled carbon nanotube bulk structure as the sample, condensed by using another objective lens and then guided to the light power meter. In this case, polarization of the laser light could be controlled to an optional direction by using a wavelength plate. The result is shown in FIG. 50.

Figure 50:
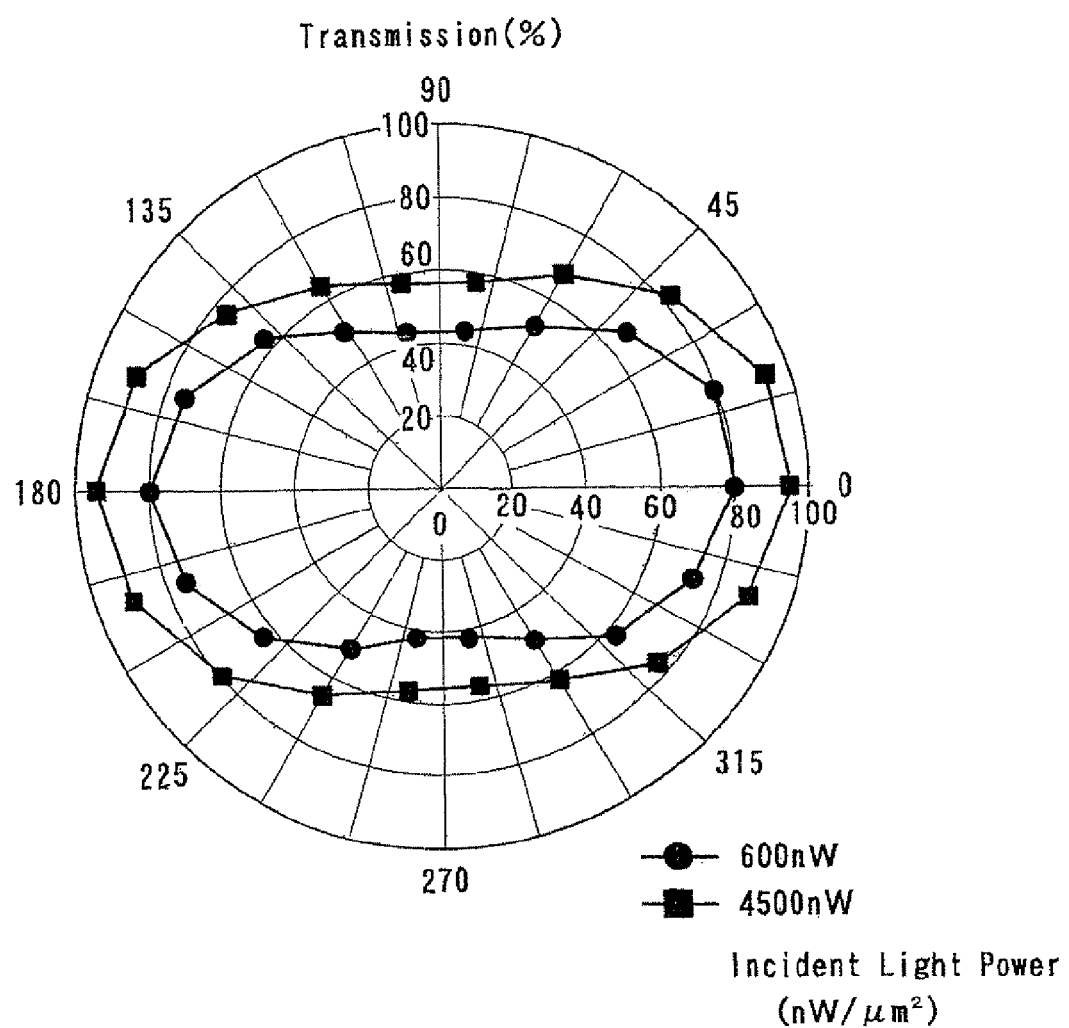
FIG. 50 is a graph showing polarization dependency of the light transmittance of an aligned single-walled carbon nanotube bulk structure as a polarizer in Example 9.

It could be confirmed from the result of FIG. 50 for the utilization of the aligned single-walled carbon nanotube bulk structure to the polarizer.

Figure 51:
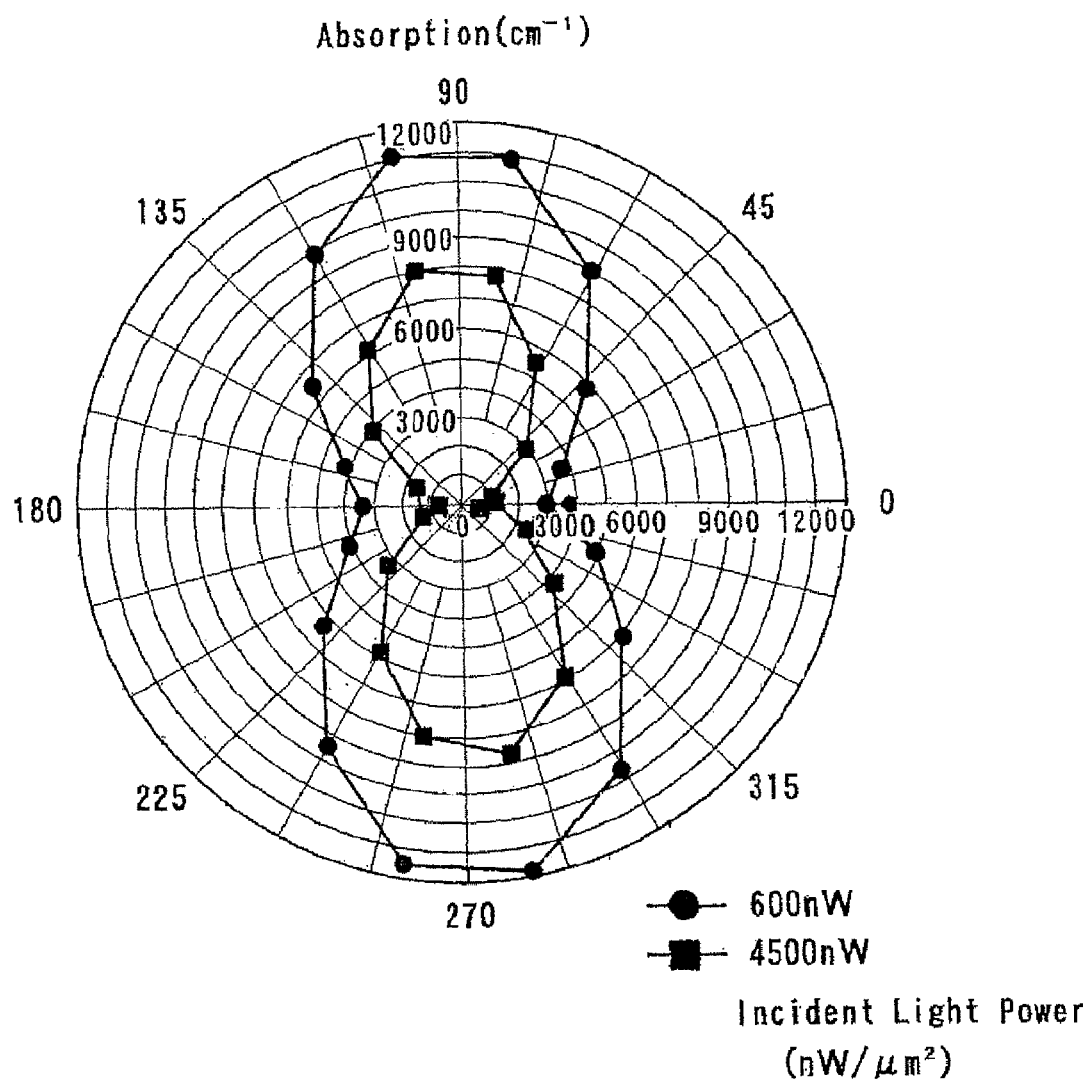
FIG. 51 is a graph showing polarization dependency of the light absorbancy of an aligned single-walled carbon nanotube bulk structure used in Example 9.

Further, the absorbancy of the sample was calculated based on the intensity of transmission light at each polarized light detected by the light power meter. The result is shown in FIG. 51. In this case, 0 degree is the aligning direction and 90 degree is a direction vertical to the aligning direction. It can be seen from FIG. 51 that the extent of the anisotropy of the light adsorbancy in the aligning direction relative to the light absorbency in the direction vertical to the aligning direction is larger than 1:10.

Example 11

Gas Storage

Figure 52:
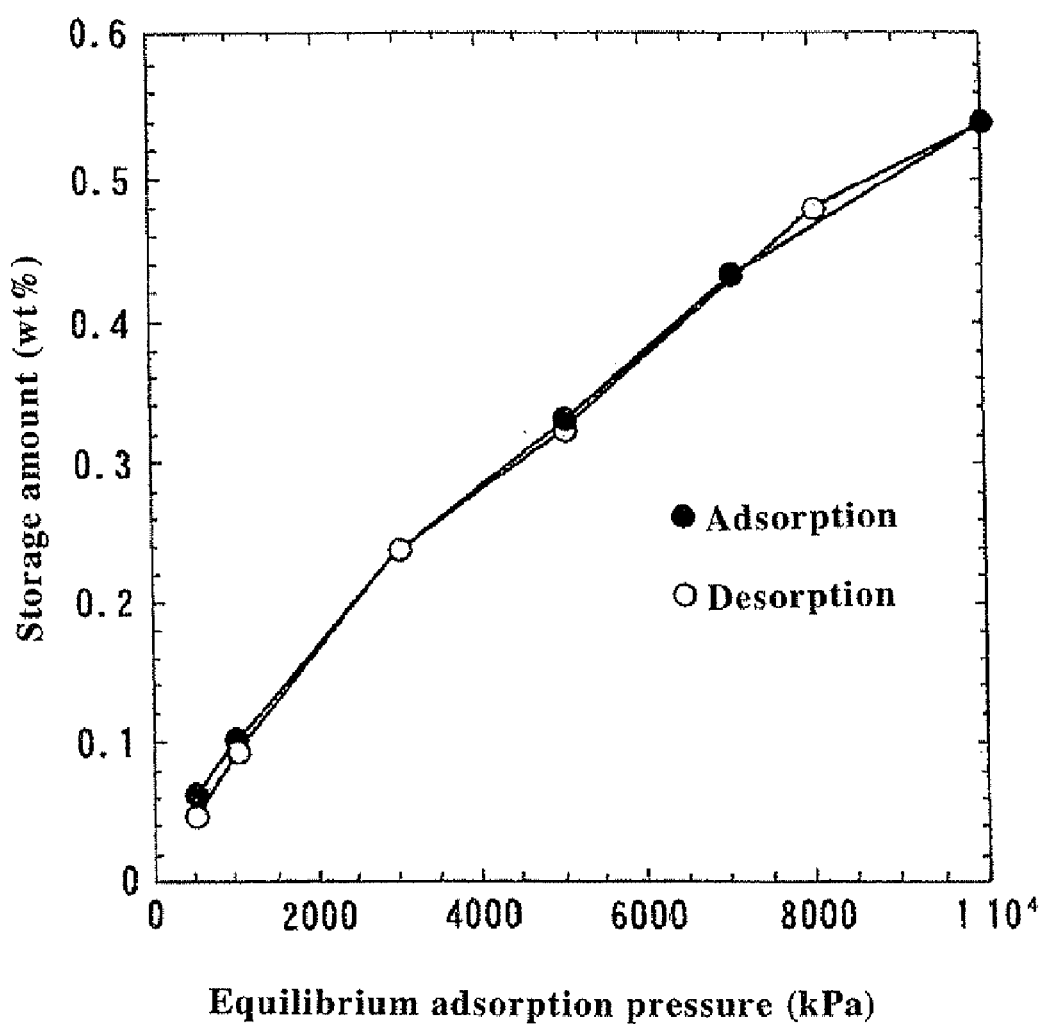
FIG. 52 is a graph showing the hydrogen storage characteristic of an aligned single-walled carbon nanotube bulk structure as a gas storage in Example 10.

For 100 mg of the aligned single-walled carbon nanotube bulk structure obtained in Example 2, measurement was carried out for hydrogen storage by using a high pressure mono-ingredient adsorption amount measuring apparatus (FMS-AD-H) manufactured by Bel Japan Inc. As a result, the storage amount of hydrogen was 0.54% by weight at 10 MPa, 20° C. Further, also in the releasing process, it was detected that reversible release depending only on the pressure was detected. The measuring result is shown in FIG. 52.

Example 12

Heat Conductor/Heat Dissipation Material

Figure 53:
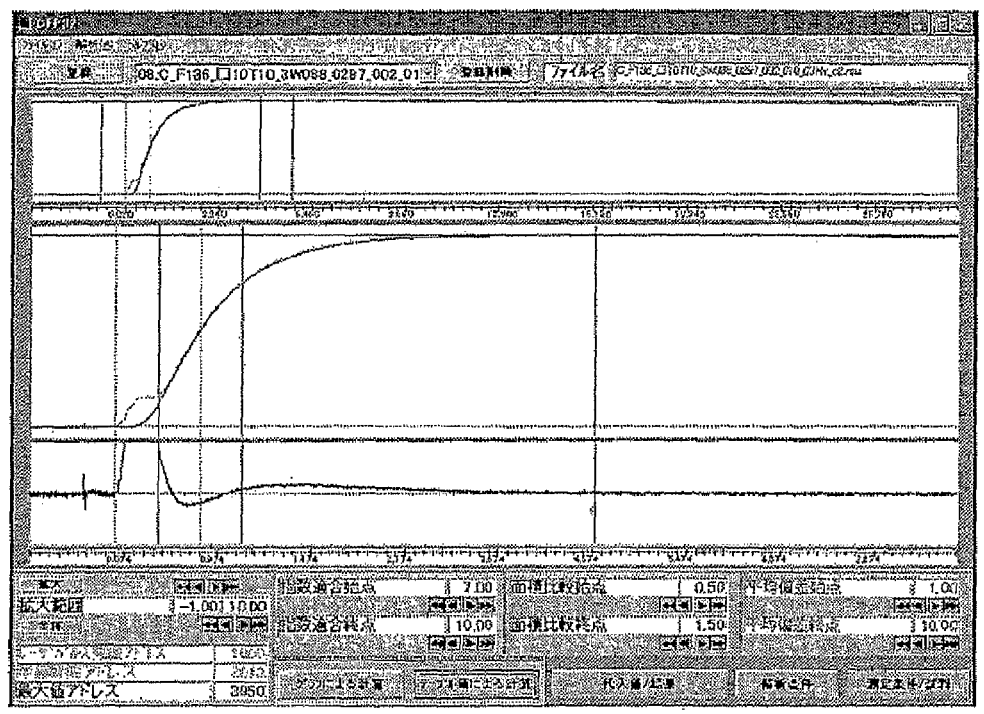
FIG. 53 is a graph showing measured data for the thermal diffusivity of an aligned single-walled carbon nanotube bulk structure as a heat dissipation material in FIG. 11.
Figure 53:
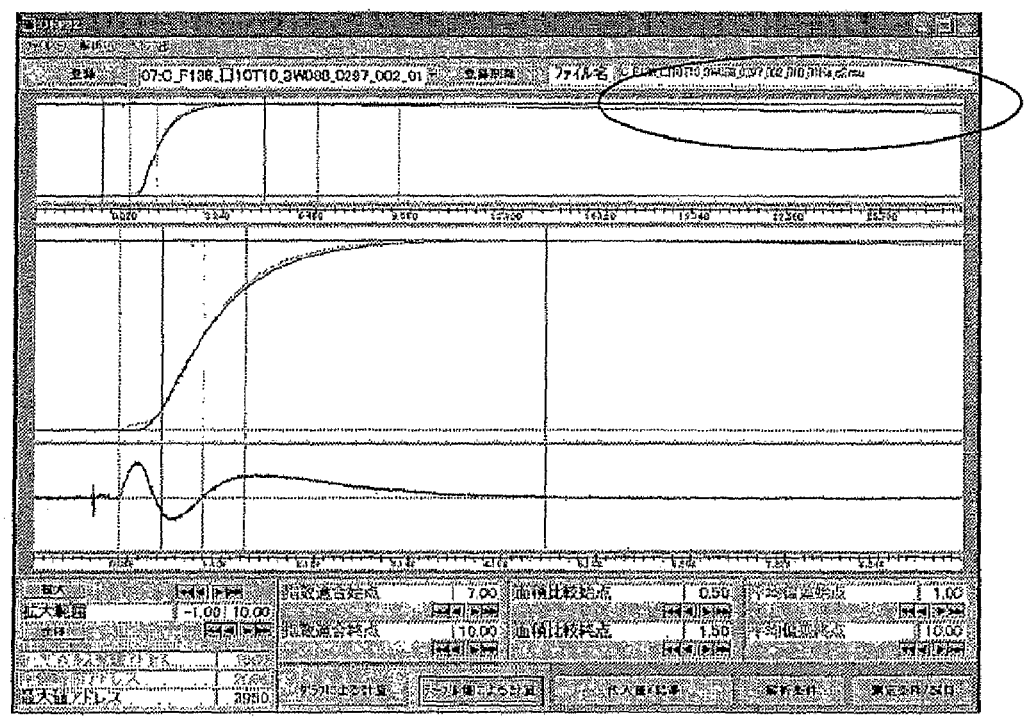

For the aligned single-walled carbon nanotube bulk structure obtained in Example 2, heat diffusion ratio was measured by a laser flash method for examining the heat conductivity. The measuring temperature was at a room temperature and the specimen size was 1 cm square. Measurement was carried out in three kinds of forms, i.e., a sample per se, and glass plates placed above or below the sample. The heat diffusion ratio was determined by a CF method and zero extrapolation for the pulse heating energy dependency. FIG. 53 shows examples of the results of measurement. In FIG. 53, (a) is measured data in vacuum, (b) is measured data in atmospheric air, the abscissa indicates time, and the ordinate indicates the specimen temperature. As the result of measurement for the specimen per se in vacuum, the thermal diffusivity α is $8.0 \times 10^{-5}$ $m^2 s^{-1}$. When several samples were measured, the thermal diffusivity a was within a range from $7.0 \times 10^{-5}$ to $1.0 \times 10^{-5}$ $m^2 s^{-1}$ even when the measuring conditions were changed. Thus, favorable heat conductivity was confirmed.

Further, in vacuum, the sample temperature was substantially constant with less effect of heat loss, and, in atmospheric air, lowering of the sample temperature was obtained to show that the effect of heat loss was large. From the foregoings, the heat dissipation effect of the aligned single-walled carbon nanotube bulk structure could be confirmed. Accordingly, it can be expected that the aligned single-walled carbon nanotubes can be utilized as the heat conductor and the heat dissipation material.

Example 13

Electric Conductor

Figure 54:
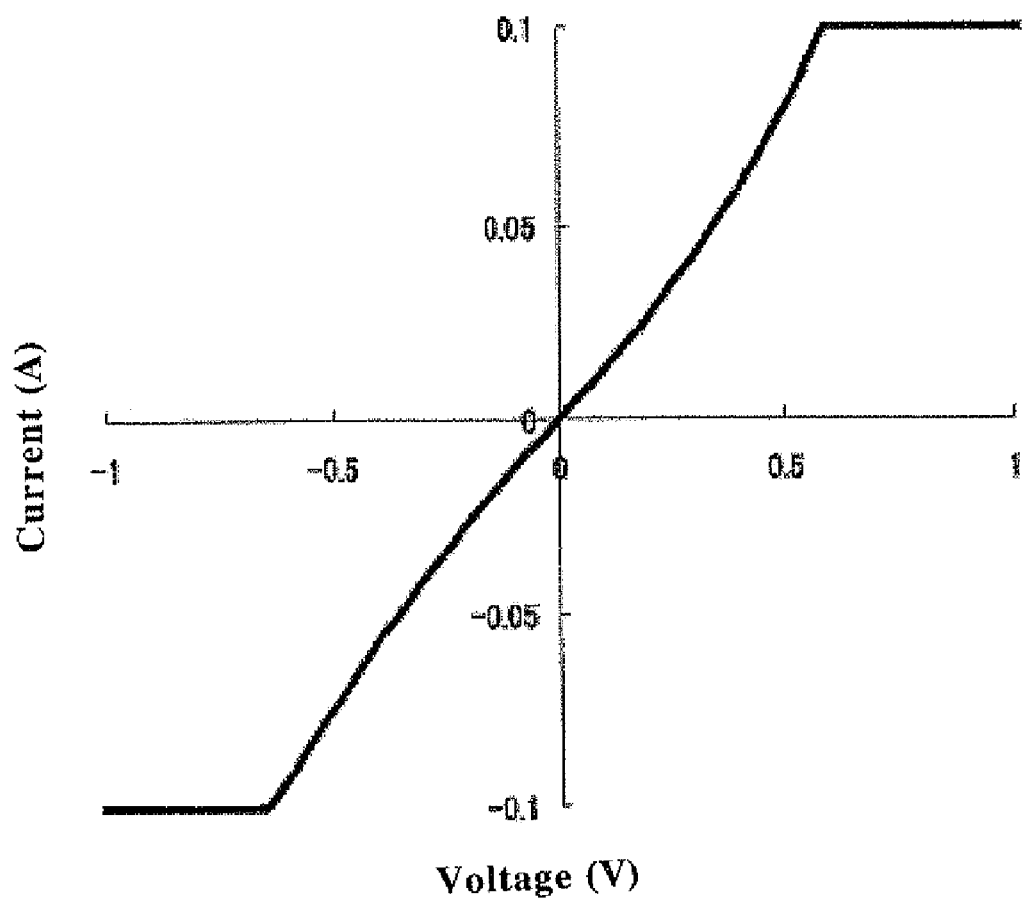
FIG. 54 is a graph showing the electric transport characteristic of an aligned single-walled carbon nanotube bulk structure as an electric conductor in Example 12.

The aligned single-walled carbon nanotube bulk structure obtained in Example 2 was formed into 1 cm×1 cm×1 mm height shape, copper plates were in contact with both sides thereof and the electric transporting characteristic was measured by 2-terminal method using a prober of Sumit-12101B-6 manufactured by Cascade Microtech Japan Inc. and a semiconductor analyzer (4155C) manufactured by Agilent Co. The result is shown in FIG. 54. From FIG. 54, it can be seen that current shows a clear ohmic dependency to voltage (amplifier of the prober reached saturation at a current value of 0.1 A). The measured resistance value was 6Ω. The resistance value includes two kinds, i.e., the conduction resistance through the aligned single-walled carbon nanotube bulk structure and the contact resistance of the aligned single-walled carbon nanotube bulk structure and the copper electrode, showing that the aligned single-walled carbon nanotube bulk structure and the metal electrode can be brought into close contact at a small contact resistance. From the foregoings, it can be expected that the aligned single-walled carbon nanotube bulk structure that it can be used as the electric conductor.

The invention claimed is:

1. A single-walled carbon nanotube having a specific surface area of between 800 $m^2/g$ or more and 2500 $m^2/g$ or less; and having a purity measured by fluorescence X-rays of 98% or more.

2. The single-walled carbon nanotube according to claim 1, having a center size of 1 to 4 nm.

3. The single-walled carbon nanotube according to claim 2, having a center size of 1.5 to 4 nm.

4. The single-walled carbon nanotube according to claim 1, wherein the single-walled carbon nanotube has a specific surface area of between 800 $m^2/g$ or more and 1300 $m^2/g$ or less, and is not open.

5. The single-walled carbon nanotube according to claim 1, wherein the single-walled carbon nanotube has a specific surface area of between 1600 $m^2/g$ or more and 2500 $m^2/g$ or less, and is open.

* * * * *